United States Patent
Nonaka et al.

(10) Patent No.: US 10,008,233 B2
(45) Date of Patent: Jun. 26, 2018

(54) RECORDING MEDIUM CHANGER AND CONTROL METHOD

(71) Applicant: SONY CORPORATION, Tokyo (JP)

(72) Inventors: Wataru Nonaka, Tokyo (JP); Osamu Shimizu, Kanagawa (JP); Hideaki Noguchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 476 days.

(21) Appl. No.: 14/774,015

(22) PCT Filed: Feb. 17, 2014

(86) PCT No.: PCT/JP2014/053612
§ 371 (c)(1),
(2) Date: Sep. 9, 2015

(87) PCT Pub. No.: WO2014/162783
PCT Pub. Date: Oct. 9, 2014

(65) Prior Publication Data
US 2016/0027464 A1    Jan. 28, 2016

(30) Foreign Application Priority Data
Apr. 5, 2013 (JP) .................. 2013-079869

(51) Int. Cl.
*G11B 17/04* (2006.01)
*G11B 15/68* (2006.01)

(52) U.S. Cl.
CPC .......... *G11B 17/04* (2013.01); *G11B 15/6835* (2013.01)

(58) Field of Classification Search
None
See application file for complete search history.

(56) References Cited

U.S. PATENT DOCUMENTS 5,570,337 A    10/1996  Dang
6,457,928 B1 * 10/2002  Ryan ................. G11B 15/6825
                                                      312/9.1
(Continued)

FOREIGN PATENT DOCUMENTS

JP      63237256 A  * 10/1988  ......... G11B 16/6825
JP      2000-113543      4/2000
(Continued)

OTHER PUBLICATIONS

Extended European Search Report dated Oct. 31, 2016 in Patent Application No. 14778117.3.
(Continued)

*Primary Examiner* — William J Klimowicz
(74) *Attorney, Agent, or Firm* — Oblon, McClelland, Maier & Neustadt, L.L.P.

(57) ABSTRACT

A conveying block 20 for conveying recording mediums between slots 15 and a drive block 16 is provided with a recording medium delivery block 50 for delivering the recording mediums to and from the slots 15 or the drive block 16, an extendable and retractable rail portion for moving the recording medium delivery block to a desired slot, and a control block 17 for controlling extension and retraction operation of the rail portion 31. The control block 17 determines whether the slots 15 are provided in an expansion area provided in an extending direction of the rail portion 31, and when the slots 15 are provided in the expansion area, the rail portion 31 is extended so that the recording medium delivery block 50 is moved to the desired slot in the expansion area. The recording mediums are efficiently stored for changer operation.

9 Claims, 17 Drawing Sheets

(56) References Cited

U.S. PATENT DOCUMENTS

| | | | |
|---|---|---|---|
| 6,574,173 B1 | 6/2003 | Manes | |
| 6,817,683 B2 * | 11/2004 | Woo | G11B 33/0444 |
| | | | 312/9.43 |
| 7,486,472 B2 * | 2/2009 | Pollard | G11B 15/6835 |
| | | | 360/92.1 |
| 7,518,822 B1 | 4/2009 | Karidis et al. | |
| 7,532,431 B2 * | 5/2009 | Solhjell | G11B 15/6835 |
| | | | 360/92.1 |
| 8,724,332 B2 * | 5/2014 | Manes | G11B 33/02 |
| | | | 361/729 |
| 9,183,875 B2 * | 11/2015 | Ries | G06F 3/0607 |
| 9,715,894 B2 * | 7/2017 | Ostwald | G11B 15/682 |
| 2004/0042354 A1 | 3/2004 | Takano | |
| 2005/0240953 A1 * | 10/2005 | Awano | G11B 17/223 |
| | | | 720/670 |
| 2006/0268450 A1 * | 11/2006 | Nave | G11B 15/689 |
| | | | 360/96.4 |
| 2015/0071744 A1 * | 3/2015 | Miyaguchi | G11B 15/6835 |
| | | | 414/277 |

FOREIGN PATENT DOCUMENTS

| | | | |
|---|---|---|---|
| JP | 2004-14045 | 1/2004 | |
| JP | 2004-95033 | 3/2004 | |
| JP | 2005251350 A * | 9/2005 | G11B 15/6835 |
| JP | 2007-257735 | 10/2007 | |
| WO | WO 01/56025 A1 | 8/2001 | |

OTHER PUBLICATIONS

International Search Report dated May 13, 2014 in PCT/JP2014/053612.

Combined Office Action and Search Report dated Dec. 19, 2016 in Chinese Patent Application No. 201480018655.X (with English language translation).

* cited by examiner

RECORDING MEDIUM CHANGER AND CONTROL METHOD

TECHNICAL FIELD

The present technology relates to a recording medium changer and a control method, with which recording mediums are efficiently stored for changer operation.

BACKGROUND ART

Conventionally, in order to store data of content (e.g., image, music, writing, or information of their combinations), various programs, or the like, a recording medium changer is used. In the recording medium changer, a plurality of recording mediums or cartridges storing the recording mediums (hereinafter simply referred to as "recording mediums") is stored in a housing. In the recording medium changer, a conveying block conveys and mounts a desired recording medium to a drive block.

Further, the recording medium changer is configured to store a large number of recording mediums. For example, Patent Document 1 discloses a drive block which is fixedly mounted to a housing. The drive block is disposed behind slots (cells) relative to an accessor, and the slots for storing mediums has a slot of a size equal to one medium to be housed, as a medium insertion portion of a drive block.

CITATION LIST

Patent Document

Patent Document 1: Japanese Patent Application Laid-Open No. 2000-113543

SUMMARY OF THE INVENTION

Problems to be Solved by the Invention

However, when the slot of a size equal to one medium is used as the medium insertion portion of the drive block, a place for adding slots is limited in front of the drive block, and many slots cannot be provided in the housing.

Therefore, in the present technology, a recording medium changer and a control method with which efficiently store a large number of recording mediums for changer operation.

Solutions to Problems

According to a first aspect of the present technology,
a recording medium changer includes:
a plurality of slots for storing recording mediums;
a drive for performing operation using a recording medium;
a recording medium delivery mechanism having a conveying mechanism for conveying the recording mediums between the plurality of slots and the drive, and a conveying mechanism control portion for controlling the operation of the conveying mechanism;
the conveying mechanism delivering the recording mediums to and from the slots or the drive; and
an extendable and retractable rail portion for moving the recording medium delivery mechanism to a desired slot,
the conveying mechanism control portion determining whether the slot is provided in an expansion area provided in an extending direction of the rail portion to perform extension and retraction operation of the rail portion based on a result of the determination.

In the recording medium changer according to the present technology, the conveying mechanism conveys the recording mediums between the plurality of slots for storing the recording mediums and the drive for performing operation using a recording medium. The conveying mechanism includes the recording medium delivery mechanism for delivering the recording mediums to and from the slots or the drive, and the extendable and retractable rail portion for moving the recording medium delivery mechanism to a desired slot. The conveying mechanism control portion for controlling the operation of the conveying mechanism determines whether the slot is provided in the expansion area provided in the extending direction of the rail portion, and, for example, when the expansion area is provided with the slot, and the recording medium delivery mechanism delivers the recording medium to and from the slot in the expansion area, the conveying mechanism control portion extends the rail portion to move the recording medium delivery mechanism to the slot in the expansion area. For example, when the expansion area is configured to be provided as a unit, determination whether the slots are provided in the expansion area is made based on information representing unit connection order from each unit output to the conveying mechanism control portion together with information representing an arrangement state of the slots and the drive in the expansion area. Further, when moving the conveying mechanism, the conveying mechanism control portion brings the rail portion into a retracted state. Further, the conveying mechanism control portion extends and retracts the rail portion, positioning the recording medium delivery mechanism at a rear end side position of the extendable and retractable rail portion. A rail support portion for supporting the rail portion is provided ahead of an end of the rail portion being extended. Further, a user notification unit notifies a user to arrange the drives sequentially in a direction from a side opposite to an arrangement side on which the rail portion is arranged with respect to the recording medium delivery mechanism, to the arrangement side.

According to a second aspect of the present technology, a control method for a recording medium changer, including a plurality of slots for storing recording mediums, a drive for performing operation using a recording medium, a recording medium delivery mechanism having a conveying mechanism for conveying the recording mediums between the plurality of slots and the drive, and a conveying mechanism control portion for controlling the operation of the conveying mechanism, the conveying mechanism for delivering the recording mediums to and from the slots or the drive, and an extendable and retractable rail portion for moving the recording medium delivery mechanism to a desired slot,
the method including the steps of:
determining, by the conveying mechanism control portion, whether the slot is provided in an expansion area provided in an extending direction of the rail portion; and
performing, by the conveying mechanism control portion, extension and retraction operation of the rail portion based on a result of the determination.

Effects of the Invention

According to the present technology, the conveying mechanism for conveying the recording mediums between the slots and the drive is provided with the recording medium delivery mechanism for delivering the recording mediums to and from the slots or the drive, and the extendable and retractable rail portion for moving the recording medium delivery mechanism to a desired slot, the conveying mechanism control portion determines whether the slot is provided in the expansion area provided in the extending direction of the rail portion to perform the extension and retraction operation of the rail portion based on a result of the determination. Accordingly, when the slots are added to the expansion area, recording mediums stored in the added slots can be used, and the recording mediums are efficiently stored for the changer operation. It is noted that the effects described in the present specification are by way of example only and not limited to the description, and further may have additional effects.

MODE FOR CARRYING OUT THE INVENTION

A mode for carrying out the present technology will be described below. The description will be given in the following order.

Figure 1:
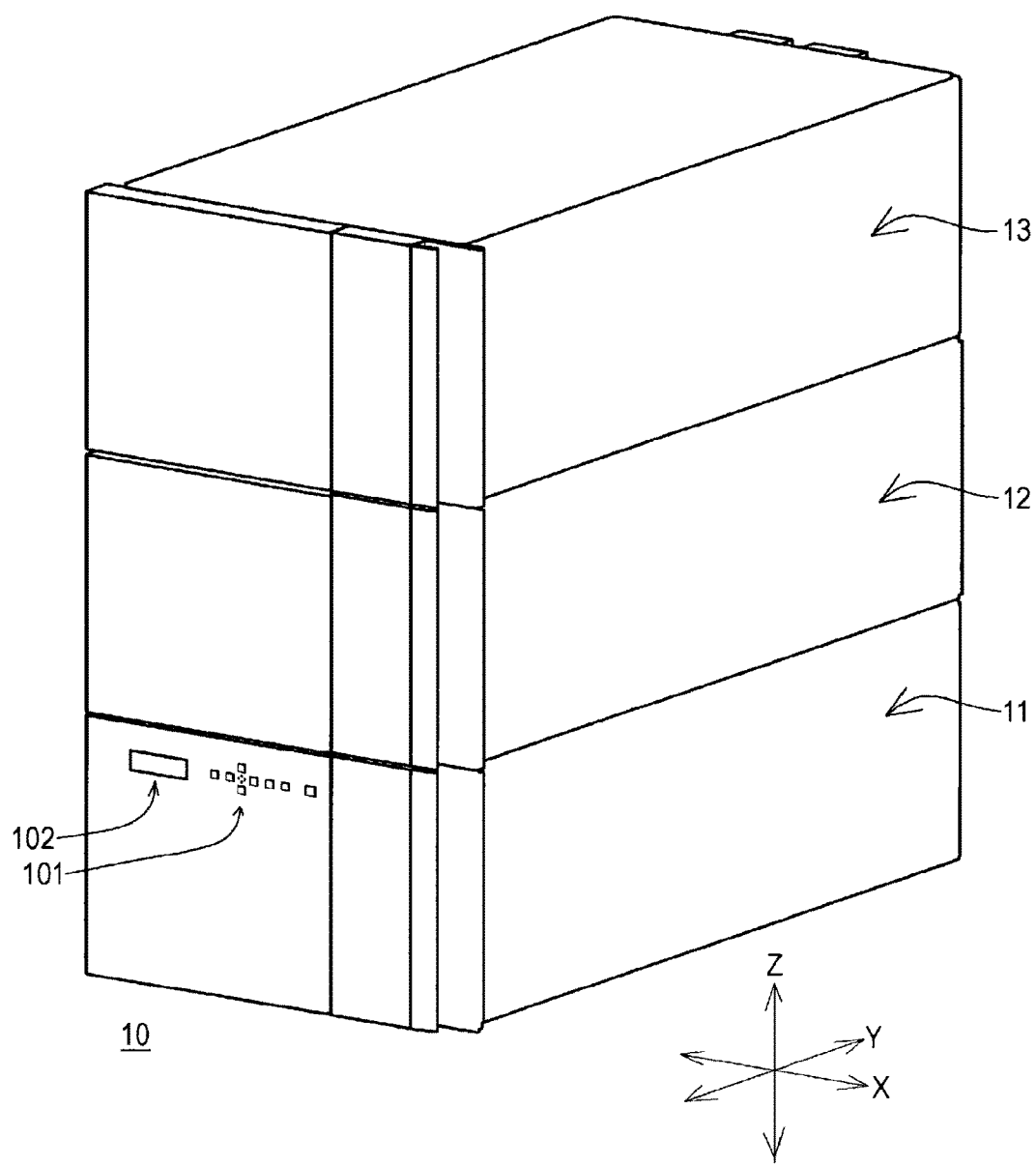
FIG. 1 is a perspective view illustrating an appearance of a recording medium changer according to an embodiment.

1. Configuration of Recording Medium Changer
2. Configuration of Conveying Block
3. Operation of Conveying Block
4. Operation of Recording Medium Changer
4-1. Unit Information Acquisition Operation
4-2. Recording Medium Carriage Operation
5. Other Configurations and Operation 1. Configuration of Recording Medium Changer FIG. 1 illustrates an appearance of a recording medium changer according to an embodiment of the present technology. The recording medium changer 10 includes slots (cells), a drive block, a conveying block, a control block, a power supply block, and the like. Further, the recording medium changer 10 has a front surface provided with an operation portion 101 or a display portion 102. The operation portion 101 includes a switch or the like for setting, switching, or the like of the operation of the recording medium changer. The display portion 102 displays an operation state of the recording medium changer, various information, or the like. It is noted that description will be made below, defining a horizontal direction of the recording medium changer 10 as an X direction, a depth direction as a Y direction, and a height direction as a Z direction.

The recording medium changer 10 is configured to expand slots or a drive block. For example, the recording medium changer 10 can provide a slot expansion unit 12 to a base unit 11 to add slots. Further, the recording medium changer 10 can provide a drive expansion unit 13 to the base unit 11 to add a drive block or slots and the drive block.

Figure 2:
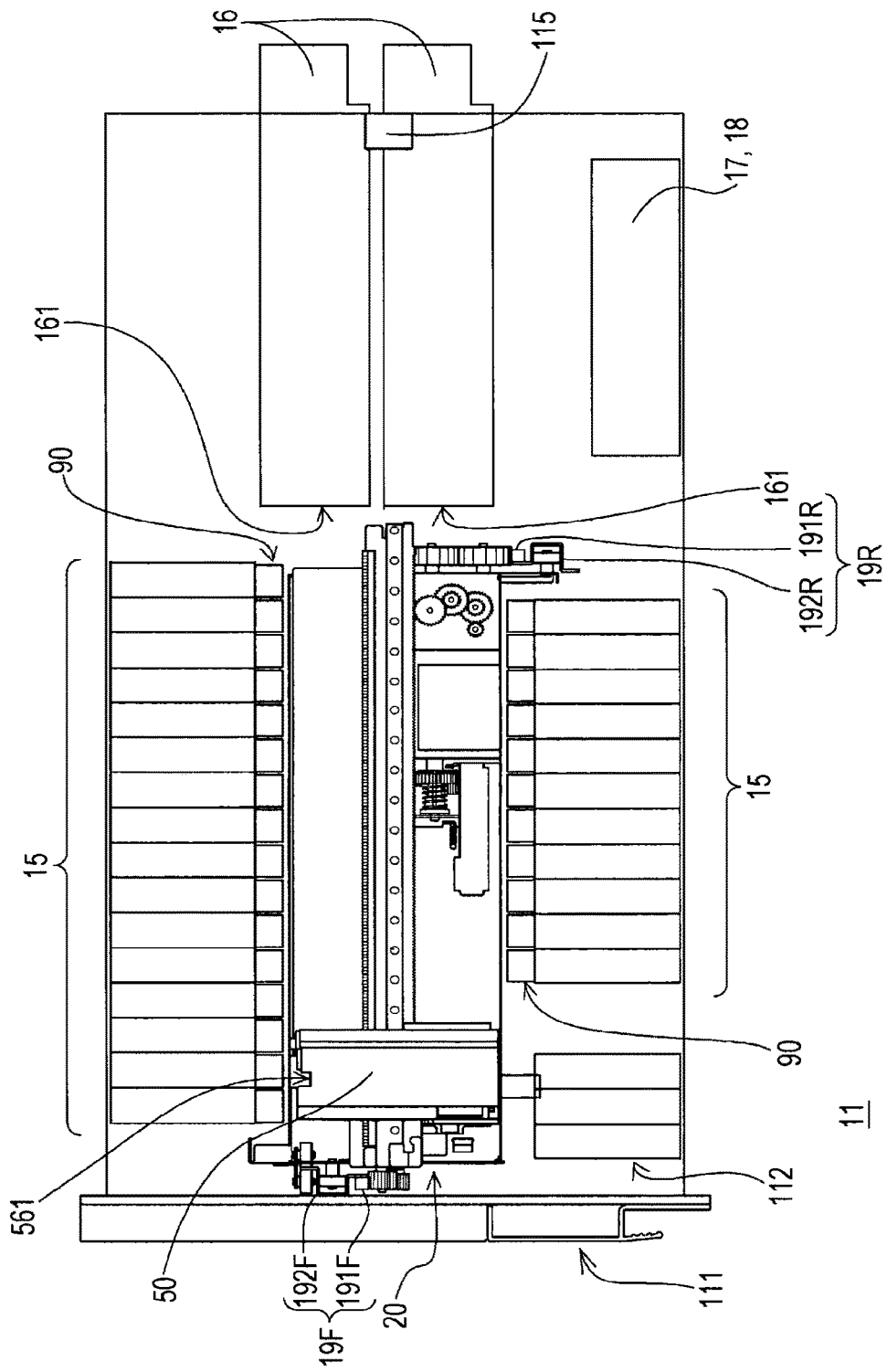
FIG. 2 is a plan view illustrating an exemplary configuration of a base unit.

FIG. 2 is a plan view illustrating an exemplary configuration of the base unit. The base unit 11 includes a door 111, a recording medium transfer portion 112, the slots 15, the drive block 16, the control block 17, the power supply block 18, the conveying block 20, and the like.

When the recording medium 90 is stored into or removed from the recording medium changer 10, the door 111 is opened and closed to draw out the recording medium transfer portion 112.

The recording medium transfer portion 112 transfers the recording medium between inside and outside the recording medium changer 10. Specifically, when the recording medium is stored in the recording medium changer 10, the recording medium is held by the recording medium transfer portion 112 and moved into the recording medium changer 10. Further, when the recording medium is removed from the recording medium changer 10, the recording medium held by the recording medium transfer portion 112 is moved outside the recording medium changer 10.

The slots 15 are, for example, arranged side by side on both side surfaces of the housing, and each of the slots stores the recording medium. Each slot 15 is provided so that an insertion/removal direction of the recording medium 90 is defined in a direction (X direction) perpendicular to a side surface of the housing. Further, as described below, the conveying block 20 is provided to be movable in a vertical direction (Z direction) between the slots 15 arranged on one side surface and the slots 15 arranged on the other side surface.

The drive block 16 is provided at a position behind the slots 15, between the slots 15 arranged on one side surface and the slots 15 arranged on the other side surface. Further, the drive block 16 is mounted so that a recording medium insertion hole 161 is directed toward the front side (toward the conveying block 20).

The conveying block 20 is a conveying mechanism for conveying the recording medium, and includes a recording medium delivery block 50. The recording medium delivery block 50 is a recording medium delivery mechanism for delivering the recording mediums 90 between the slots 15 and the drive block 16. That is, the recording medium delivery block 50 performs processing of removing the recording medium 90 from the slot 15 and temporarily holding the recording medium 90, and processing of mounting the held recording medium 90 to the drive block 16. Further, the recording medium delivery block 50 performs processing of removing the recording medium 90 ejected from the drive block 16 and temporarily holding the recording medium 90, and processing of storing the held recording medium 90 in the slot 15.

The conveying block 20 causes the recording medium delivery block 50 to move in a back and forth direction (Y direction), to position the recording medium delivery block 50 to the position of a desired slot 15 or a position corresponding to the recording medium insertion hole 161 of the drive block 16. Further, when the slot expansion unit 12 or the drive expansion unit 13 is provided, the conveying block 20 can be moved in the vertical direction (Z direction) so that the recording medium delivery block 50 is positioned at a height corresponding to the desired slot 15 or the drive block 16. Further, the recording medium delivery block 50 is operated to be moved in a direction of the slot (X direction) and to be rotated about a vertical axis (Z direction). The recording medium delivery block 50 is moved in a direction of the slot (X direction) to change a distance between the recording medium delivery block 50 and the slot 15, the recording medium 90, or the like. Further, the recording medium delivery block 50 is operated to be rotated to orient the recording medium insertion hole 561 of the recording medium delivery block 50 toward the slot 15 or the recording medium insertion hole 161 of the drive block 16. It is noted that, FIG. 2 illustrates an example of the recording medium insertion hole 561 of the recording medium delivery block 50 oriented to the left side, or in a direction of the slot 15, when viewing the drive block 16 from the front side of the recording medium changer 10.

The control block 17 is a conveying mechanism control portion for controlling the operation of the conveying block. The control block 17 controls the operation of the conveying block 20 to perform processing of removing a desired recording medium 90 from a slot 15, and mounting the desired recording medium 90 to a desired drive block 16, or processing of returning the recording medium 90 ejected from the drive block 16 to the original slot 15. Further, the control block also controls the operation of the drive block or the like. The power supply block 18 supplies power to the drive block 16, the conveying block 20, and the like of the base unit 11.

It is noted that the base unit 11 is provided with a rail support portion 115 for supporting an end side of a rail portion described below, when the rail portion is extended.

Figure 3:
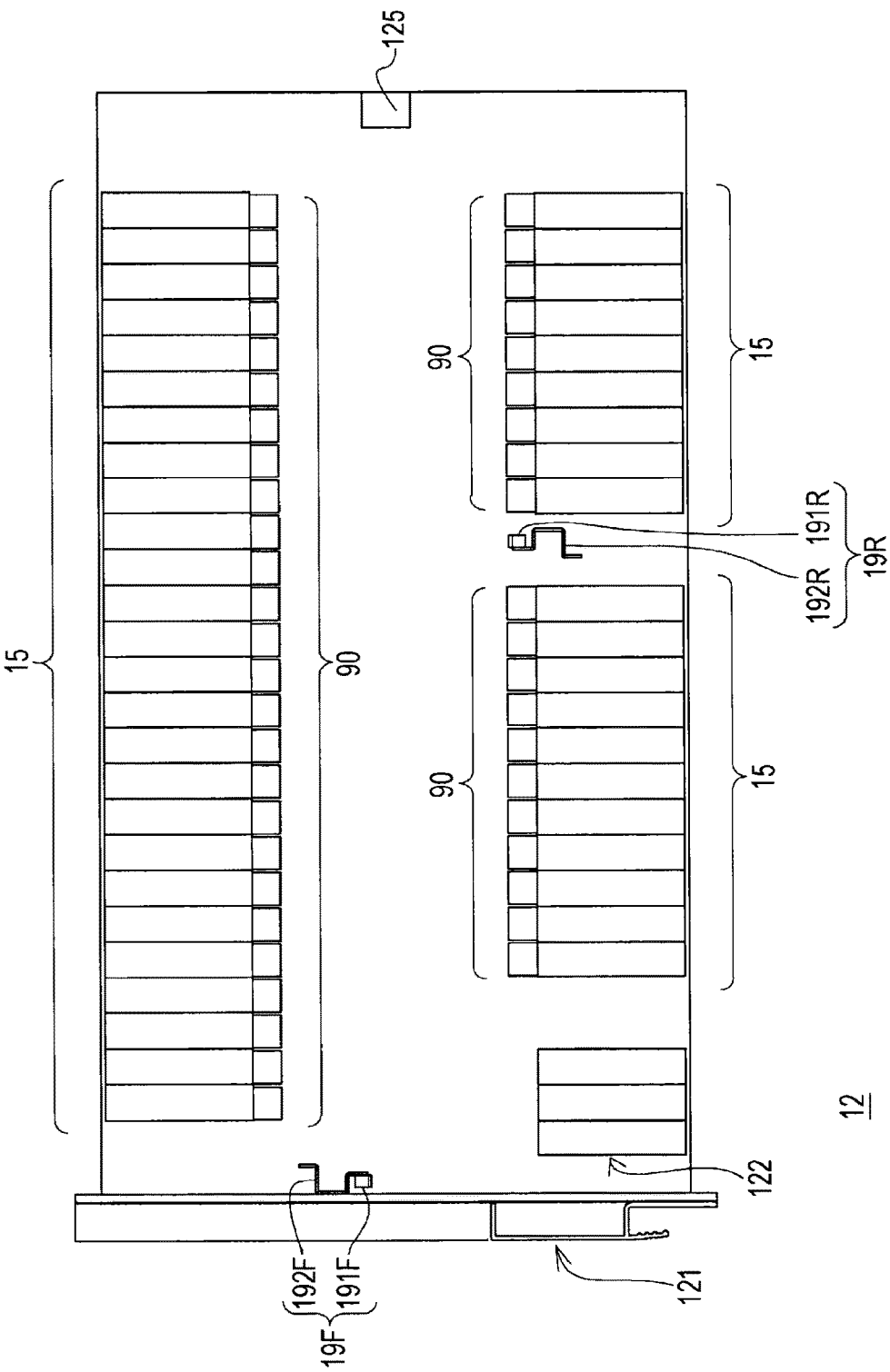
FIG. 3 is a plan view illustrating an exemplary configuration of a slot expansion unit.

FIG. 3 is a plan view illustrating an exemplary configuration of the slot expansion unit. The slot expansion unit 12 is provided with a door 121, a recording medium transfer portion 122, the slots 15, and the like.

When the recording medium 90 is stored into or removed from the recording medium changer 10, the door 121 is opened and closed to draw out the recording medium transfer portion 122.

The recording medium transfer portion 122 transfers the recording medium between inside and outside the recording medium changer 10. Specifically, when the recording medium is stored in the recording medium changer 10, the recording medium is held by the recording medium transfer portion 122 and moved into the recording medium changer 10. Further, when the recording medium is removed from the recording medium changer 10, the recording medium held by the recording medium transfer portion 122 is moved outside the recording medium changer 10.

The slots 15 are, for example, arranged into a grid pattern on both side surfaces of the housing, and each of the slots stores the recording medium. Each slot 15 is provided so that the insertion/removal direction of the recording medium 90 is oriented in a direction perpendicular to the side surface of the housing (X direction in FIG. 1). Further, a space is provided between the slots 15 arranged on one side surface and the slots 15 arranged on the other side surface. In the space, the conveying block 20 is movable in a vertical direction (Z direction in FIG. 1), when the slot expansion unit 12 is provided to the base unit 11.

It is noted that the slot expansion unit 12 is provided with a rail support portion 125 for supporting an end side of a rail portion described below, when the rail portion is extended.

Figure 4:
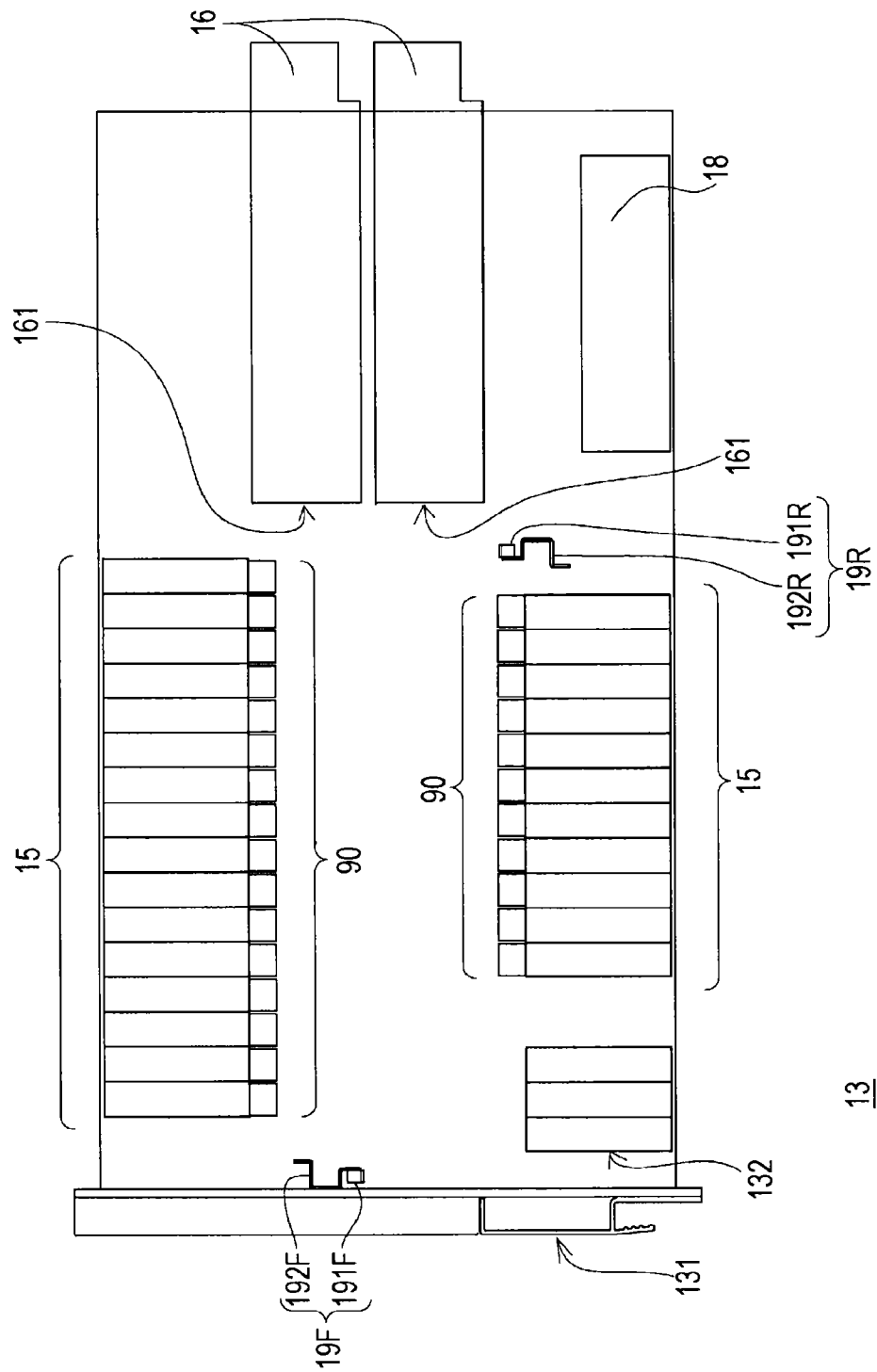
FIG. 4 is a plan view illustrating an exemplary configuration of a drive expansion unit.

FIG. 4 is a plan view illustrating an exemplary configuration of the drive expansion unit. The drive expansion unit 13 is provided with a door 131, a recording medium transfer portion 132, the slot 15, the drive block 16, and the power supply block 18.

When the recording medium 90 is stored into or removed from the recording medium changer 10, the door 131 is opened and closed to draw out the recording medium transfer portion 132.

The recording medium transfer portion 132 transfers the recording medium between inside and outside the recording medium changer 10. Specifically, when the recording medium is stored in the recording medium changer 10, the recording medium is held by the recording medium transfer portion 132 and moved into the recording medium changer 10. Further, when the recording medium is removed from the recording medium changer 10, the recording medium held by the recording medium transfer portion 132 is moved outside the recording medium changer 10.

The slots 15 are, for example, arranged into a grid pattern on both side surfaces of the housing, and each of the slots stores the recording medium. Each slot 15 is provided so that the insertion/removal direction of the recording medium 90 is oriented in a direction perpendicular to the side surface of the housing (X direction in FIG. 1). Further, a space is provided between the slots 15 arranged on one side surface and the slots 15 arranged on the other side surface. In the space, the conveying block 20 is movable in a vertical direction (Z direction in FIG. 1), when the drive expansion unit 13 is provided to the base unit 11.

The drive block 16 is provided at a position behind the slots 15, between the slots 15 arranged on one side surface and the slots 15 arranged on the other side surface. Further, the drive block 16 is mounted so that a recording medium insertion hole 161 is directed toward the front side (toward the conveying block 20). The power supply block 18 supplies power to the drive block 16 and the like of the drive expansion unit 13.

The base unit 11, the slot expansion unit 12, and the drive expansion unit 13 are provided with a guide mechanism 19, for example racks 191 and guide plates 192, for moving the conveying block 20 over the units. The recording medium changer 10 moves the conveying block 20 to positions in the slot expansion unit 12 and the drive expansion unit 13, in addition to the base unit 11, using the guide mechanism 19. Accordingly, the recording medium changer 10 can convey the recording medium 90 stored in any of the slots 15 of the base unit 11, the slot expansion unit 12, and the drive expansion unit 13 to the drive block 16 of the base unit 11 or the drive expansion unit 13. Further, the recording medium changer 10 can return the recording medium ejected from the drive block 16 to the original slot 15.

Further, the recording medium changer 10 conveys the recording medium 90 between the slot 15 and the recording medium transfer portion 112, 122, or 132, and the recording medium can be stored in the recording medium changer 10 or the stored recording medium can be removed from the recording medium changer 10.

Figure 5:
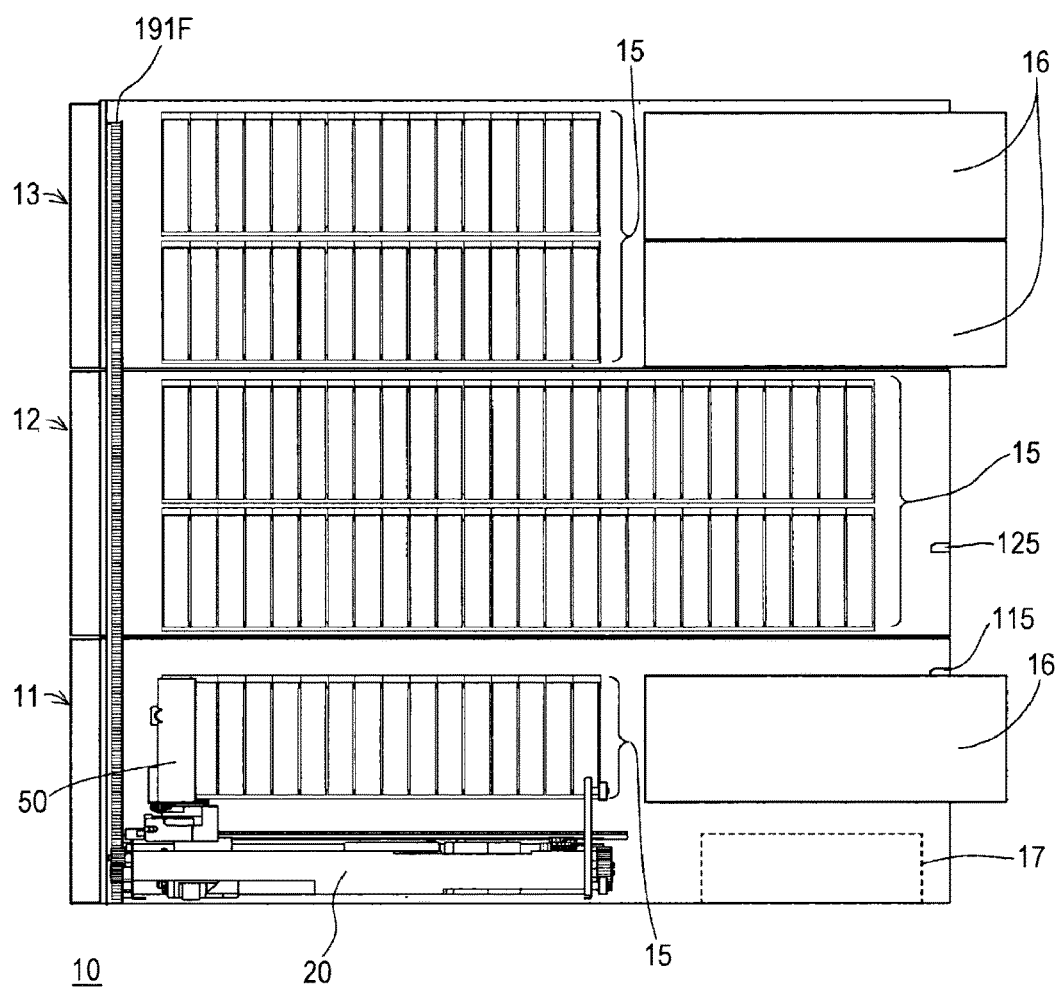
FIG. 5 is an inner side view illustrating an exemplary configuration of a recording medium changer using a base unit, a slot expansion unit, and a drive expansion unit (positioning a conveying block in the base unit).
Figure 6:
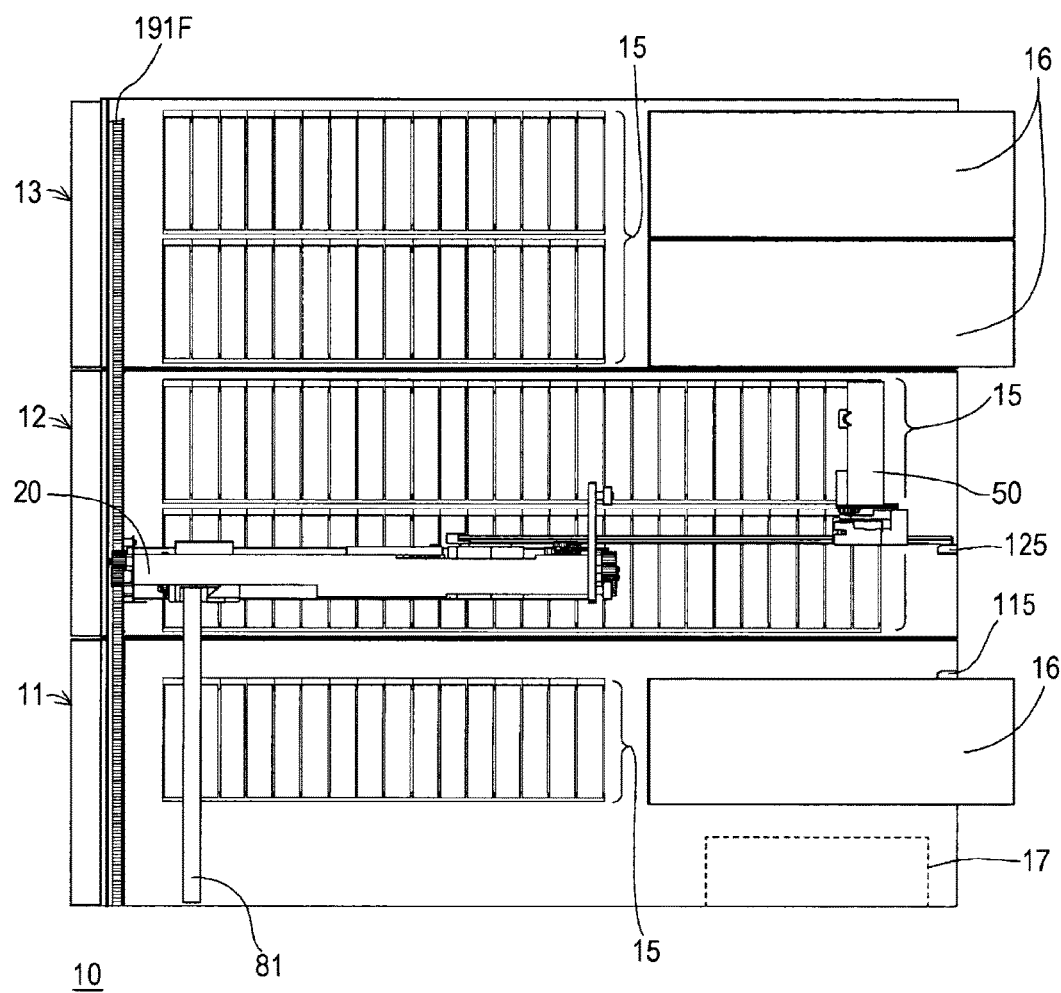
FIG. 6 is an inner side view illustrating an exemplary configuration of the recording medium changer using the base unit, the slot expansion unit, and the drive expansion unit (positioning the conveying block in the slot expansion unit).
Figure 7:
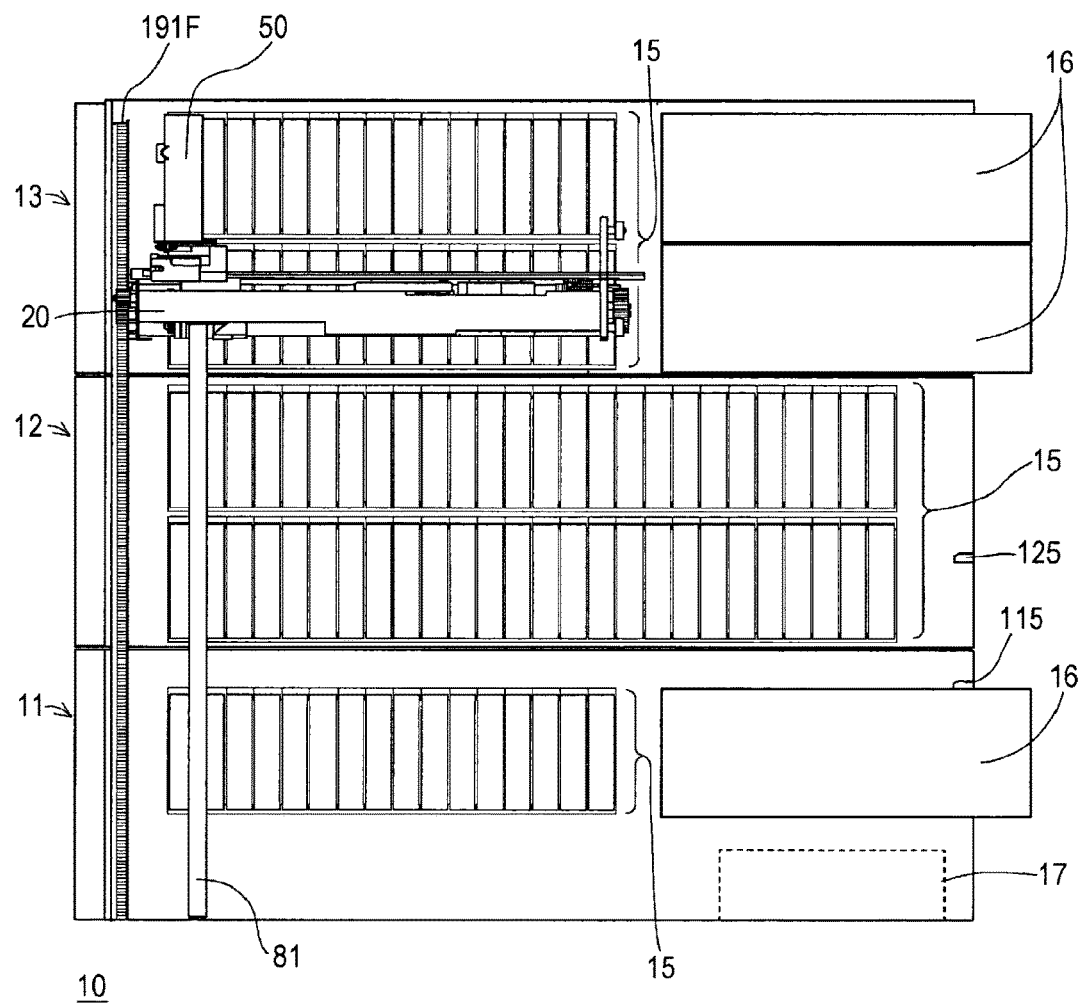
FIG. 7 is an inner side view illustrating an exemplary configuration of the recording medium changer using the base unit, the slot expansion unit, and the drive expansion unit (positioning the conveying block in the drive expansion unit).

FIGS. 5 to 7 are inner side views illustrating exemplary configurations of the recording medium changer using the base unit, the slot expansion unit, and the drive expansion unit. It is noted that FIG. 5 illustrates the conveying block positioned in the base unit. FIG. 6 illustrates the conveying block positioned in the slot expansion unit, and FIG. 7 illustrates the conveying block positioned in the drive expansion unit.

The recording medium changer 10 delivers the recording mediums 90 between the slots 15 of the base unit 11, and the recording medium delivery block 50. In this configuration, as illustrated in FIG. 5, the recording medium changer 10 moves the conveying block 20 in a direction (Z direction in FIG. 1) in which the recording medium delivery block 50 has a height equal to that of the desired slot 15, using the racks 191. Further, the recording medium changer 10 moves the recording medium delivery block 50 in a depth direction (Y direction in FIG. 1) so that the recording medium delivery block 50 is positioned to face the desired slot 15.

Further, the recording medium changer 10 delivers the recording mediums 90 between the slots 15 of the slot expansion unit 12 and the recording medium delivery block 50. In this configuration, as illustrated in FIG. 6, the recording medium changer 10 moves the conveying block 20 in a direction (Z direction in FIG. 1) in which the recording medium delivery block 50 has a height equal to that of the desired slot, using the racks 191. Further, the recording medium changer 10 moves the recording medium delivery block 50 in a depth direction (Y direction in FIG. 1) so that the recording medium delivery block 50 is positioned to face the desired slot 15. It is noted that, in the conveying block 20, the rail portion 31 is configured to be extended and retracted so that the recording medium delivery block 50 can move to a position at which the recording medium delivery block 50 faces the desired slot. Here, as illustrated in FIG. 6, when the rail portion 31 is extended and retracted, an end of the rail portion 31 is supported by the rail support portion 125.

Further, the recording medium changer 10 delivers the recording mediums 90 between the slots 15 of the drive expansion unit 13 and the recording medium delivery block 50. In this configuration, as illustrated in FIG. 7, the recording medium changer 10 moves the conveying block 20 in a direction (Z direction in FIG. 1) in which the recording medium delivery block 50 has a height equal to that of the desired slot, using the racks 191. Further, the recording medium changer 10 moves the recording medium delivery block 50 in a depth direction (Y direction in FIG. 1) so that the recording medium delivery block 50 is positioned to face the desired slot.

Further, the conveying block 20, and the control block 17 and the power supply block 18 of the base unit 11 are connected by a cable 81, and communication or power supply is performed through the cable 81.

It is noted that the recording medium changer 10 is not limited to the configuration including the base unit 11, the slot expansion unit 12, and the drive expansion unit 13, as described above. For example, the recording medium changer 10 may have a configuration using a housing having a predetermined size, and internally provided with an area corresponding to the base unit, or an area corresponding to the slot expansion unit and/or the drive expansion unit.

2. Configuration of Conveying Block

Figure 8:
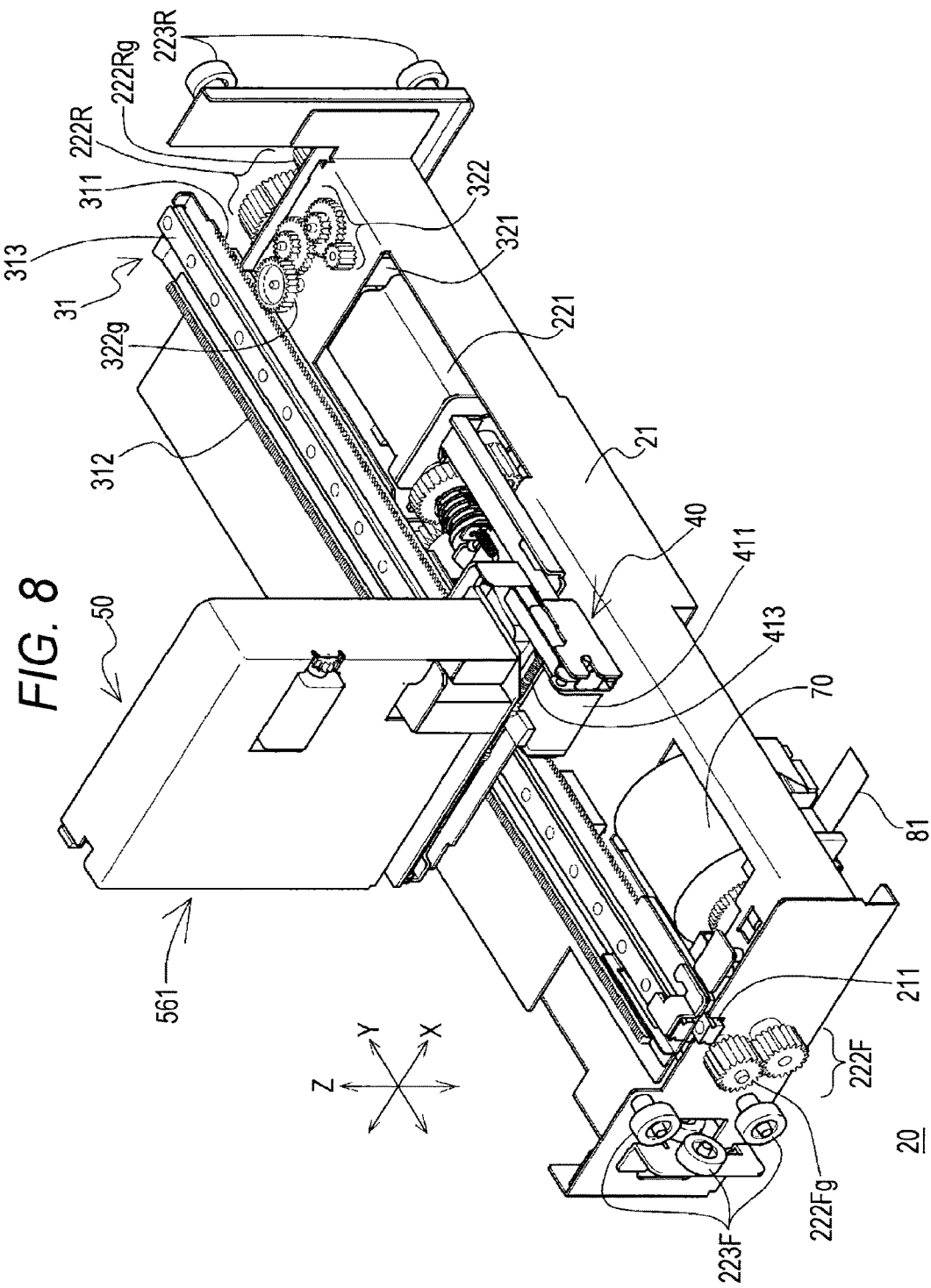
FIG. 8 is a perspective view illustrating an exemplary configuration of the conveying block (viewed from the front side).
Figure 9:
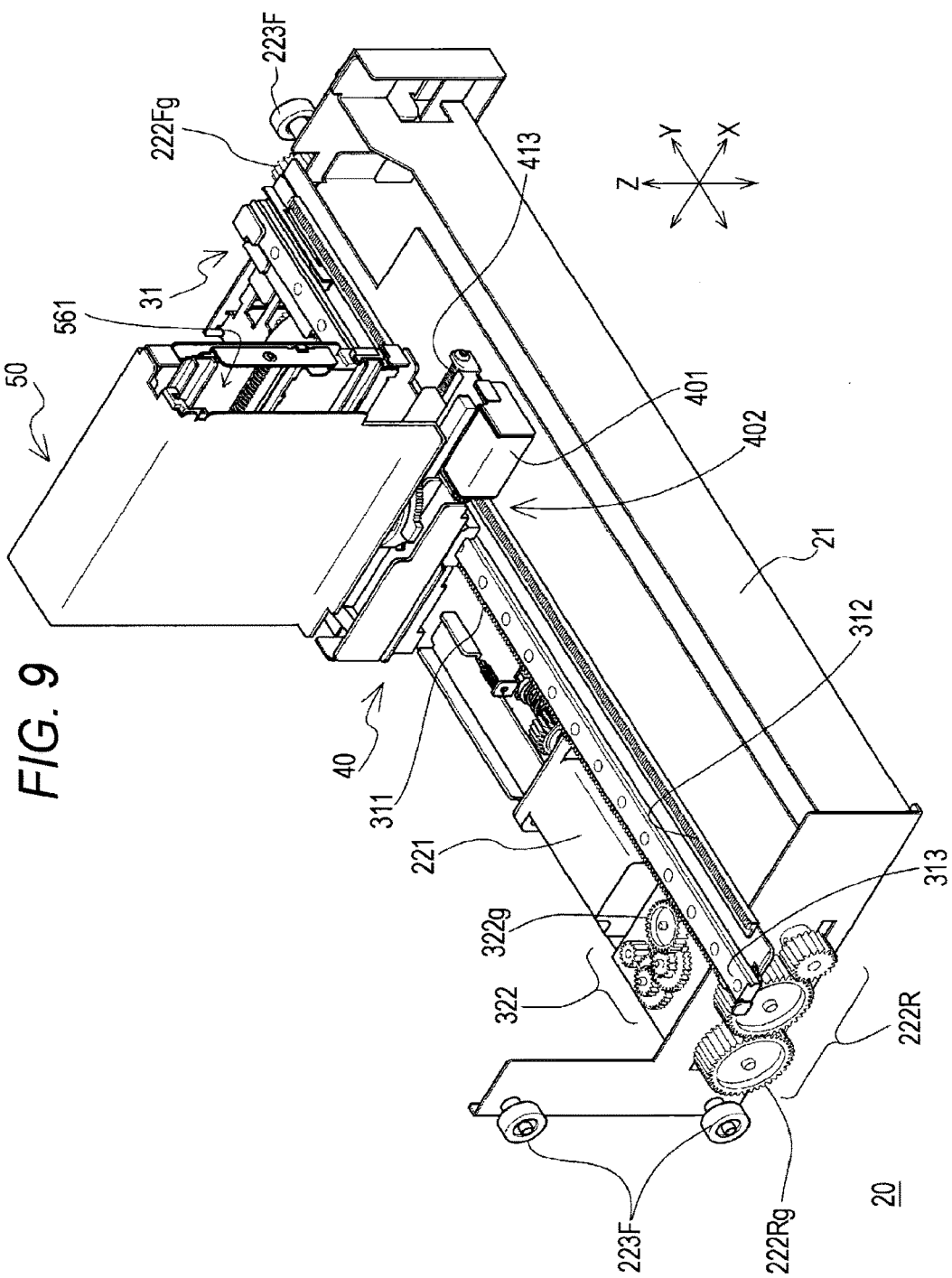
FIG. 9 is a perspective view illustrating an exemplary configuration of the conveying block (viewed from the back side).
Figure 10:
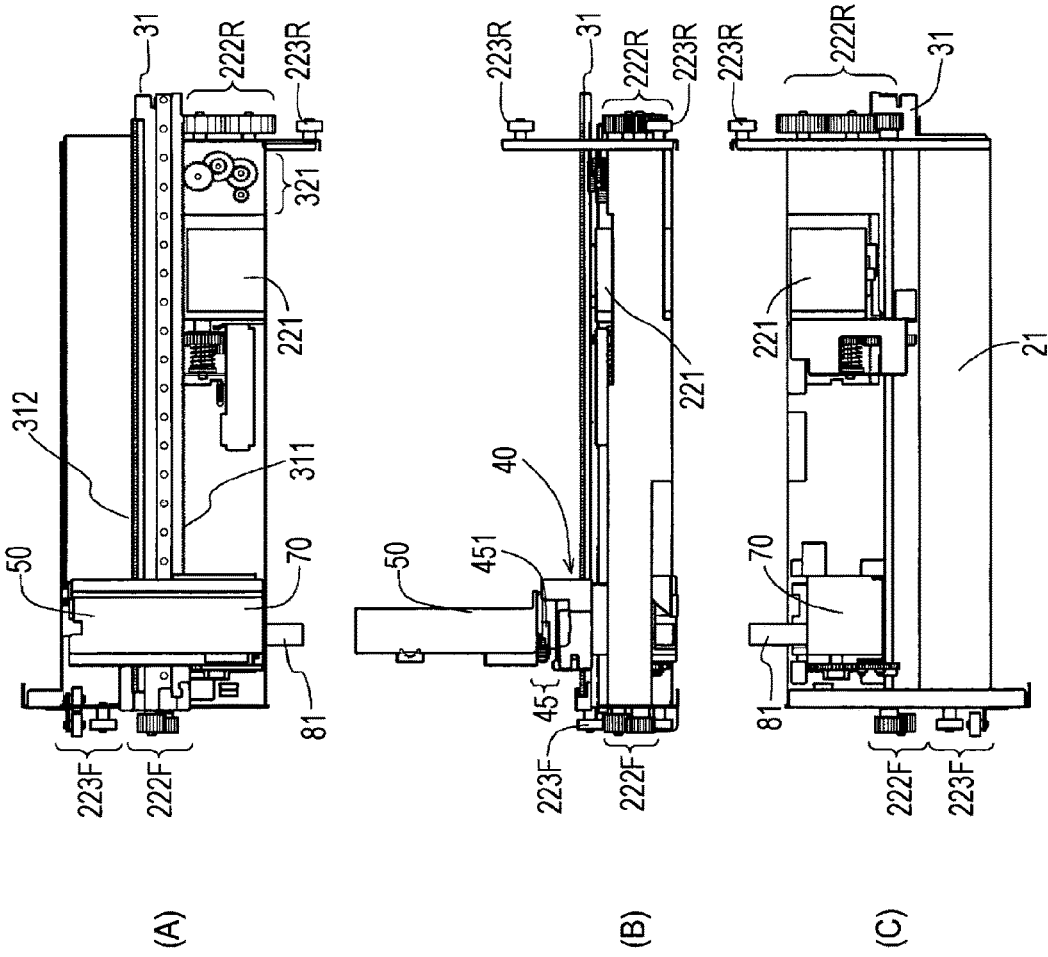
FIGS. 10(A) to 10(C) are diagrams illustrating exemplary configurations of the conveying block (a retracted state of a rail portion).
Figure 11:
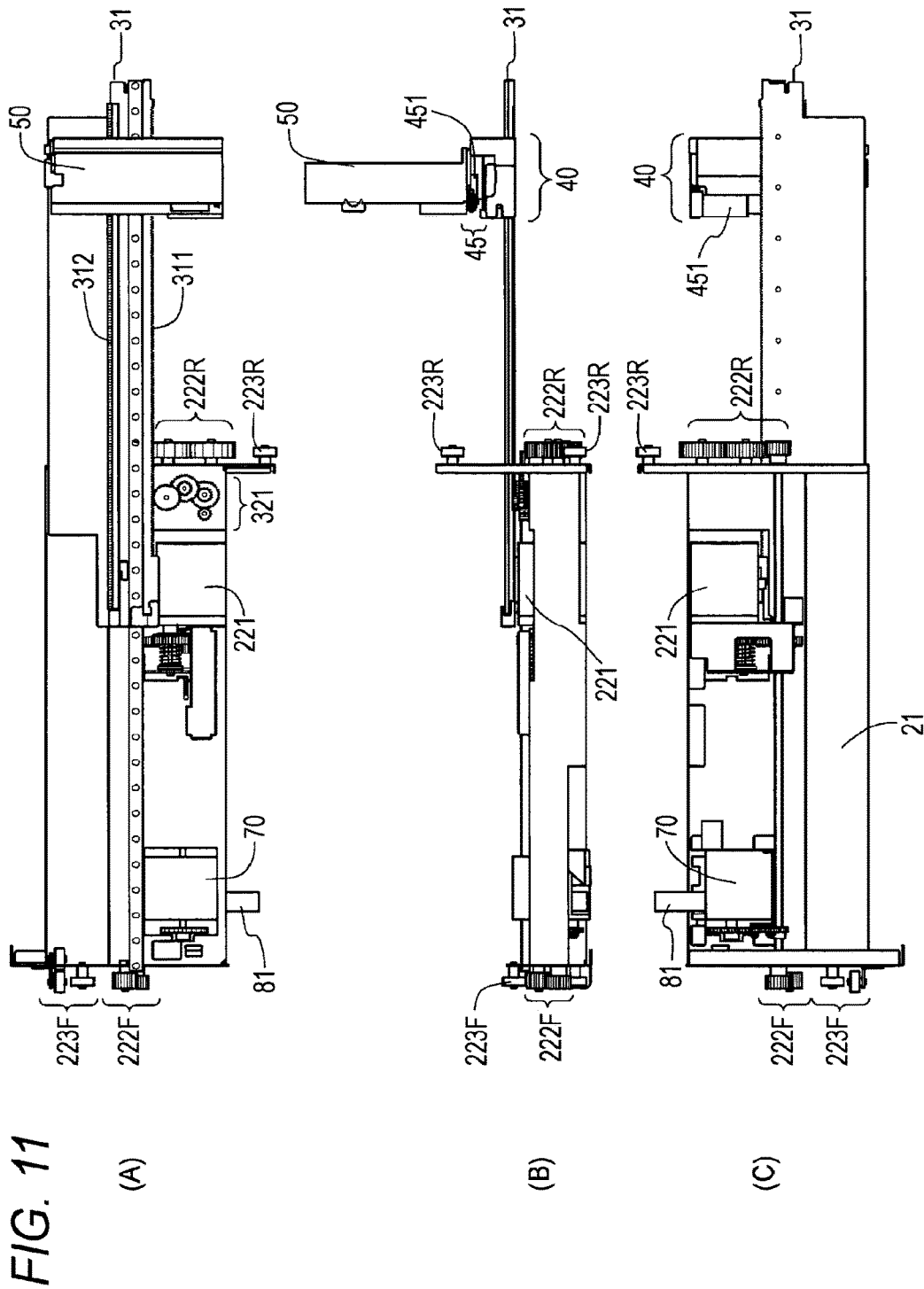
FIGS. 11(A) to 11(C) are diagrams illustrating exemplary configurations of the conveying block (an extended state of the rail portion).
Figure 12:
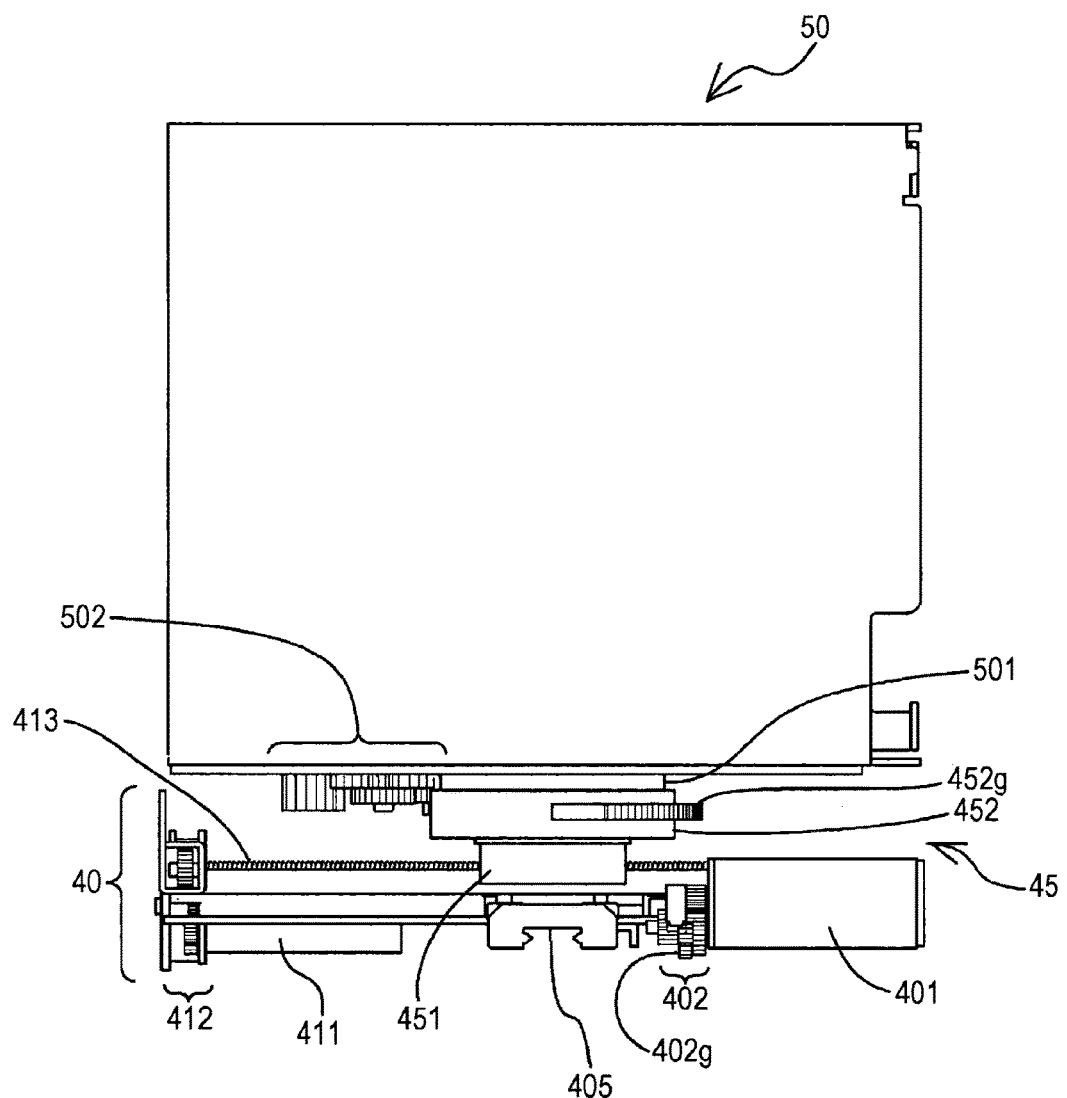
FIG. 12 is a diagram of a support portion of a recording medium delivery block, viewed from the back side of the recording medium changer.

Next, a configuration of the conveying block 20 will be described. FIGS. 8 and 9 are perspective views illustrating exemplary configurations of the conveying block 20. FIG. 8 is a perspective view of the conveying block 20, viewed from the front side of the recording medium changer 10, and FIG. 9 is a perspective view of the conveying block 20, viewed from the back side of the recording medium changer 10. FIGS. 10(A) to 10(C) and FIGS. 11(A) to 11(C) are diagrams illustrating exemplary configurations of the conveying block, FIGS. 10(A) to 10(C) illustrate retracted states of the rail portion, and FIGS. 11(A) to 11(C) illustrate extended states of the rail portion. It is noted that FIGS. 10(A) and 11(A) are exemplary plan views, FIGS. 10(B) and 11(B) are exemplary right side views, and FIGS. 10(C) and 11(C) are exemplary bottom views. FIG. 12 is a diagram of a support portion of the recording medium delivery block 50, viewed from the back side of the recording medium changer 10.

The conveying block 20 has a conveying block chassis 21 provided with a conveying block moving mechanism, the rail portion, and a rail moving mechanism.

The conveying block moving mechanism includes a conveying block moving motor 221, drive transmitting portions 222F and 222R, guide rollers 223F and 223R, and the like.

The conveying block moving motor 221 generates a driving force for moving the conveying block 20 in a vertical direction (Z direction in FIG. 1). The drive transmitting portion 222F includes, for example, a plurality of gears, and a driven gear (pinion) 222Fg is provided to be meshed with a rack 191F of a guide portion 19F provided in the base unit 11, the slot expansion unit 12, and the drive expansion unit 13. The drive transmitting portion 222R includes, for example, a plurality of gears, and a driven gear (pinion) 222Rg is provided to be meshed with a rack 191R of a guide portion 19R provided in the base unit 11, the slot expansion unit 12, and the drive expansion unit 13. Accordingly, the conveying block 20 is moved in a vertical direction according to rotation of the driven gears (pinions) 222Fg and 222Rg of the drive transmitting portions 222F and 222R by the conveying block moving motor 221.

A pair of guide rollers 223F holds a guide plate 192F of a guide portion 19F between the guide rollers. The other guide roller 223F moves in a guide groove of the guide plate 192F. The guide roller 223R moves in a guide groove of a guide plate 192R of the guide portion 19R. Accordingly, when moving in the vertical direction, the conveying block 20 is positioned at an appropriate position by the guide rollers 223F and 223R.

The rail portion 31 has a side surface on which a rack 311 for driving the rail portion 31 in a rail longitudinal direction (Y direction in FIG. 1) is formed. The rail portion 31 has a surface on the recording medium delivery block side, on which a rack 312 and a guide 313 are formed for moving a recording medium delivery block base 40 described below in the rail longitudinal direction. The rail portion 31 has an opposite surface side on which a guide receiving portion (not illustrated) is formed. The guide receiving portion is fitted to embrace a slide guide 211 provided at the conveying block chassis 21 in the rail longitudinal direction, and holds the rail portion 31 to be extended and retracted in the rail longitudinal direction. The rack 311 is meshed with a driven gear (pinion) 322g of a drive transmitting portion 322 constituting the rail moving mechanism. Further, the rack 312 is meshed with a driven gear (pinion) 402g of a drive transmitting portion 402 constituting a recording medium delivery block base-moving mechanism described below.

The rail moving mechanism includes a rail moving motor 321 and the drive transmitting portion 322 mounted to the conveying block chassis 21, and the rack 311 provided at the rail portion 31, and the like.

The rail moving motor 321 generates a driving force for moving the rail portion 31 in the rail longitudinal direction. The drive transmitting portion 322 includes, for example, a plurality of gears, and the driven gear (pinion) 322g is meshed with the rack 311 of the rail portion 31. Accordingly, the rail portion 31 is moved in the rail longitudinal direction according to the rotation of the driven gear (pinion) 322g of the drive transmitting portion 322 by the rail moving motor 321. At this time, the guide receiving portion of the rail portion 31 slides while fitting with the slide guide 211.

The rail portion 31 is provided with the recording medium delivery block base 40 moving on the rail in the rail longitudinal direction. The recording medium delivery block base 40 is provided with a recording medium delivery block holding portion 45 for holding the recording medium delivery block 50 to be turned about a vertical axis (Z direction in FIG. 1). Further, the recording medium delivery block holding portion 45 is provided to be moved relative to the recording medium delivery block base 40, in a direction perpendicular to the rail longitudinal direction (X direction in FIG. 1).

Further, the conveying block 20 is provided with the recording medium delivery block base moving mechanism, a recording medium delivery block holding portion moving mechanism, and a recording medium delivery block rotating mechanism.

The recording medium delivery block base moving mechanism moves the recording medium delivery block base 40 in the rail longitudinal direction. The recording medium delivery block base-moving mechanism includes a recording medium delivery block base moving motor 401 and the drive transmitting portion 402 mounted to the recording medium delivery block base 40, the rack 311 provided at the rail portion 31, and the like.

The recording medium delivery block base moving motor 401 generates a driving force for moving the recording medium delivery block base 40 in the rail longitudinal direction. As illustrated in FIG. 12, the drive transmitting portion 402 includes, for example, a plurality of gears, and the driven gear (pinion) 402g is meshed with the rack 312 of the rail portion 31 of FIG. 8 and the like. Further, the recording medium delivery block base 40 is provided with the guide receiving portion 405 of FIG. 12, and the guide receiving portion 405 is fitted to embrace the guide 313 of the rail portion 31. Accordingly, the recording medium delivery block base 40 moves on the rail portion in the rail longitudinal direction (Y direction in FIG. 1), according to the rotation of the driven gear (pinion) 402g of the drive transmitting portion 402 by the recording medium delivery block base moving motor 401. At this time, a guide receiving portion 405 of the recording medium delivery block base 40 slides while fitting with the guide 313.

The recording medium delivery block holding portion moving mechanism moves the recording medium delivery block holding portion 45 relative to the recording medium delivery block base 40, in a direction perpendicular to the rail longitudinal direction (X direction in FIG. 1). The recording medium delivery block holding portion moving mechanism includes a holding portion moving motor 411, a drive transmitting portion 412, and a feed screw 413 mounted to the recording medium delivery block base 40, a nut 451 provided at the recording medium delivery block holding portion 45, and the like.

The holding portion moving motor 411 of FIG. 12 generates a driving force for moving the recording medium delivery block holding portion 45 relative to the recording medium delivery block base 40, in a direction perpendicular to the rail longitudinal direction. The drive transmitting portion 412 includes, for example, a plurality of gears, and the feed screw 413 is concentrically mounted to a driven gear. Accordingly, the nut 451 of the recording medium delivery block holding portion 45 is moved in an axial direction of the feed screw 413 according to the rotation of the driven gear of the drive transmitting portion 412 by the holding portion moving motor 411.

A cylindrical bearing portion 452 is mounted to the nut 451 of the recording medium delivery block holding portion 45. The bearing portion 452 has an outer peripheral surface on which a tooth portion 452g is formed.

The recording medium delivery block 50 has a rotation shaft 501 inserted into the bearing portion 452 of the recording medium delivery block holding portion 45, and rotatably held by the recording medium delivery block holding portion 45.

The recording medium delivery block 50 is provided with the recording medium delivery block rotating mechanism for rotating the recording medium delivery block 50 about the rotation shaft 501. The recording medium delivery block rotating mechanism includes a recording medium delivery block rotation driving motor (not illustrated) and a drive transmitting portion 502 which are mounted to the recording medium delivery block 50, and the bearing portion 452 of the recording medium delivery block holding portion 45, and the like.

The recording medium delivery block rotation driving motor generates a driving force for rotating the recording medium delivery block 50. The drive transmitting portion 502 includes, for example, a plurality of gears, and a driven gear is meshed with the tooth portion 452g of the bearing portion 452. Accordingly, the recording medium delivery block 50 rotates about the rotation shaft 501, according to the rotation of the driven gear of the drive transmitting portion 502 by the recording medium delivery block rotation driving motor.

Further, the conveying block 20 is provided with a cable processing block 70 for winding or unwinding the cable 81 when the conveying block 20 is moved in the vertical direction by the conveying block moving mechanism.

It is noted that the rail moving mechanism, the recording medium delivery block base moving mechanism, the recording medium delivery block holding portion moving mechanism, and the recording medium delivery block rotating mechanism in the conveying block 20 are not limited to the above-mentioned configurations. For example, the drive transmitting portion is not limited to have the plurality of gears, and may have another configuration. Further, the motor may be provided at the other member or the like.

3. Operation of Conveying Block

Figure 13:
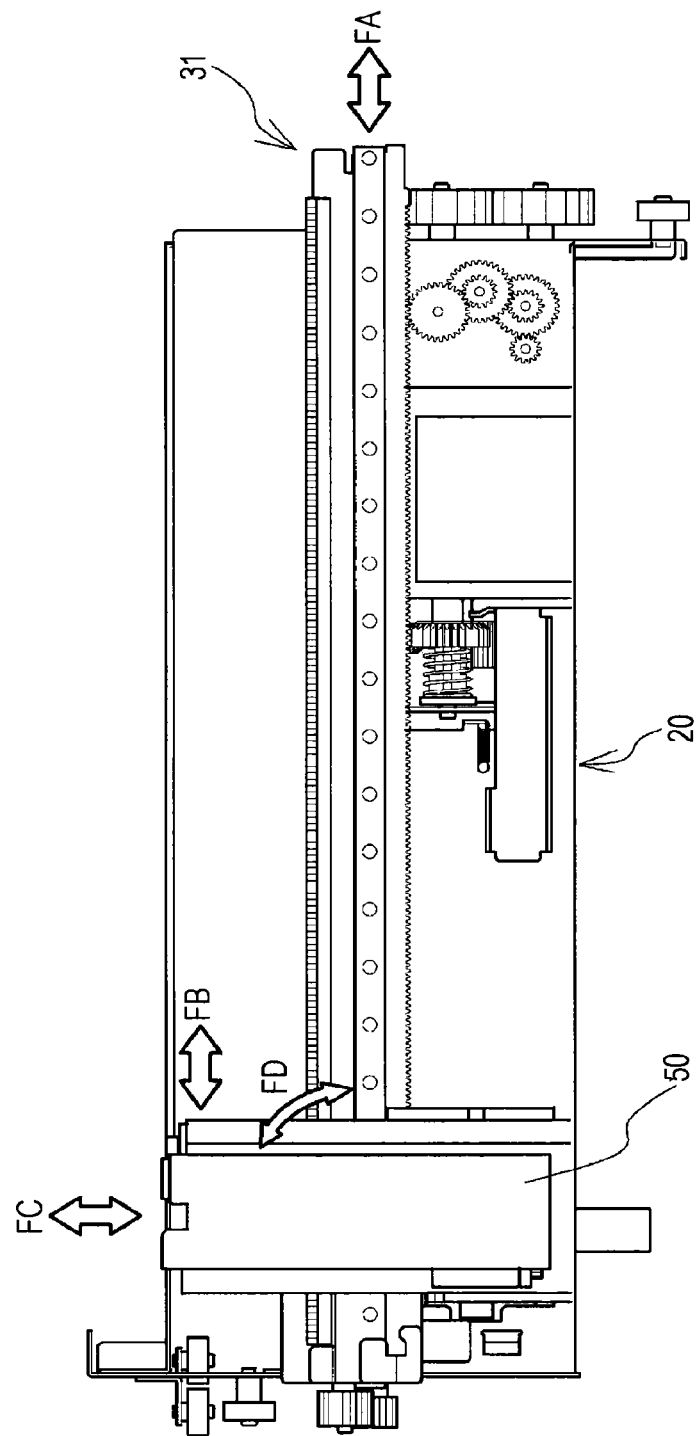
FIG. 13 is a diagram illustrating operation of the conveying block.

FIG. 13 is a diagram illustrating operation of the conveying block. In the conveying block 20, the above-mentioned rail moving mechanism can move the rail portion 31 in a direction indicated by an arrow FA. In the conveying block 20, the above-mentioned recording medium delivery block base moving mechanism can move the recording medium delivery block 50 on the rail portion 31 in a direction indicated by an arrow FB. Further, in the conveying block 20, the recording medium delivery block holding portion moving mechanism can move the recording medium delivery block 50 in a direction indicated by an arrow FC. Still further, in the conveying block 20, the recording medium delivery block rotating mechanism can rotate the recording medium delivery block 50 in a direction indicated by an arrow FD.

Accordingly, in the conveying block 20, the recording medium delivery block 50 can be moved to a position of a desired slot, by the rail moving mechanism and the recording medium delivery block base moving mechanism. Further, in the conveying block 20, the recording medium insertion hole of the recording medium delivery block 50 is oriented toward the desired slot 15 or the recording medium insertion hole of the drive block 16, by the recording medium delivery block rotating mechanism. Further, in the conveying block 20, when the recording medium insertion hole 561 of the recording medium delivery block 50 is directed toward the desired slot 15, the recording medium delivery block holding portion moving mechanism can move the recording medium delivery block 50 in the recording medium insertion/removal direction of the slot 15. Further, in the conveying block 20, when the recording medium delivery block 50 and the recording medium insertion hole of the drive block 16 face each other, the recording medium delivery block holding portion moving mechanism can move the recording medium delivery block 50 to a position of the recording medium insertion hole 161 of a desired drive block 16. It is noted that, when the recording medium delivery block 50 is positioned at a desired position by the conveying block 20, the recording medium delivery block 50 delivers the recording medium to and from the slot 15 or the drive block 16.

4. Operation of Recording Medium Changer

In the recording medium changer 10 as described above, when the slot expansion unit 12 or the drive expansion unit 13 is provided, the slots 15 or the drive block 16 can be added. Further, in the recording medium changer 10, the recording medium changer 10 may have a housing of a fixed size to add the slots 15 or the drive block 16. Still further, the recording medium changer 10 may be configured to change the slots 15 to the drive block 16 or the drive block 16 to the slots 15. As described above, when the slots 15 or the drive block 16 can be added or changed, the recording medium changer 10 drives the conveying block 20, in consideration of arrangement of the slots 15 or the drive block 16 after the addition or change.

4-1. Unit Information Acquisition Operation

The slot expansion unit 12 and the drive expansion unit 13 used for the recording medium changer 10 are each provided with a control sub-block. The control sub-block communicates with the control block 17 provided at the base unit 11, and provides, to the control block 17, unit information including information about the expansion unit, for example, information representing an arrangement state or the like of the slots or the drive block. The control block 17 determines, for example, the arrangement of the slots 15 or the drive block 16 in the recording medium changer 10, or whether the slots are provided in the expansion area provided in the extending direction of the rail portion, based on the unit information supplied from the control sub-block of each expansion unit, and controls the drive of the conveying block 20.

Figure 14:
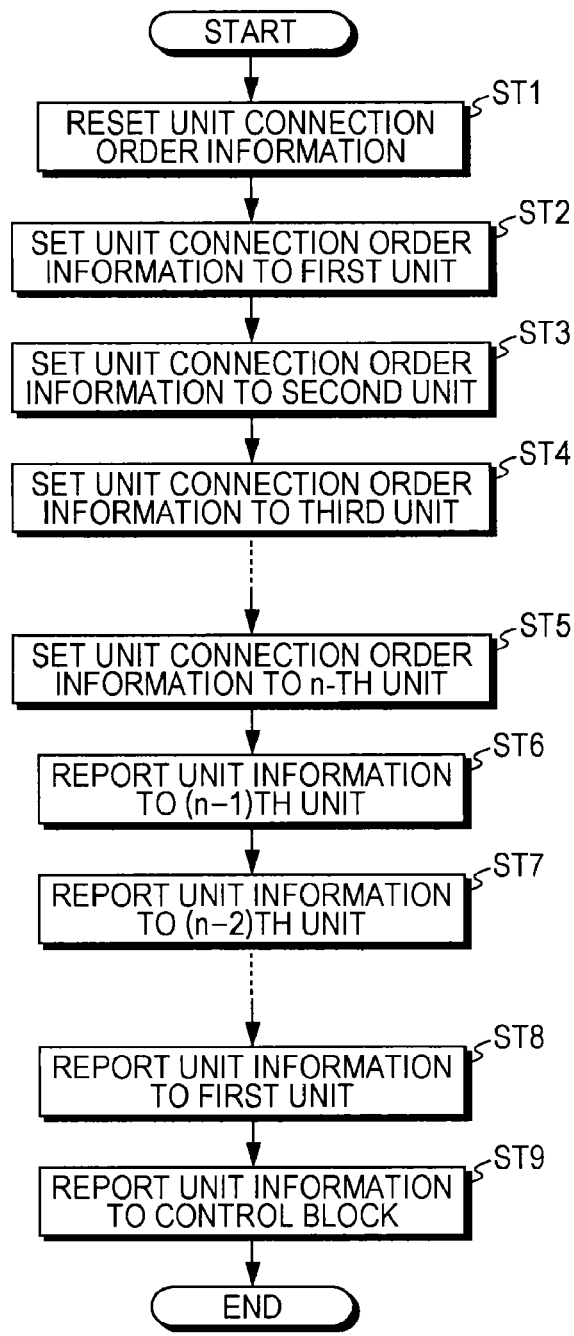
FIG. 14 is a flowchart illustrating an exemplary unit information acquisition operation.
Figure 15:
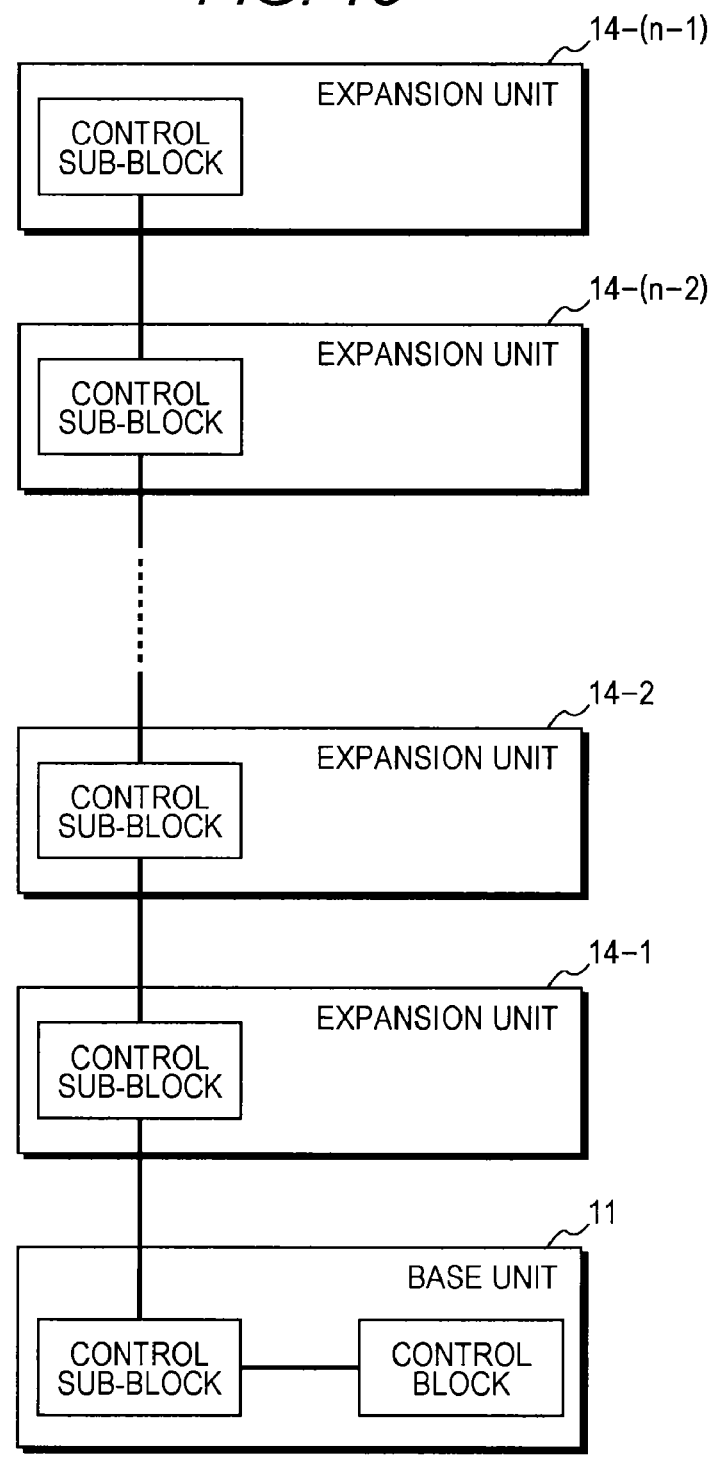
FIG. 15 is a diagram illustrating an exemplary unit configuration of the recording medium changer.

FIG. 14 is a flowchart illustrating an exemplary unit information acquisition operation which is performed when the recording medium changer 10 is brought into a power-on state from a power-off state. It is assumed that the recording medium changer 10 has, for example as illustrated in FIG. 15, a total of n units, i.e., one base unit 11 and (n-1) expansion units 14-1 to 14-(n-1).

In step ST1, the control block resets unit connection order information. The unit connection order information is, for example, information representing a unit connection order indicating where the unit is connected relative to the base unit, and when brought into the power-on state, the control block 17 resets the unit connection order information of each control sub-block, and proceeds to step ST2.

In step ST2, the control block sets the unit connection order information to the first unit. Here, the control block 17 defines the base unit as the first unit, and causes a control sub-block of the base unit to store unit connection order information "UT1" indicating the first unit, and proceeds to step ST3.

In step ST3, the control sub-block of the first unit sets the unit connection order information to the second unit. The control sub-block of the first unit defines an unset unit to which the unit connection order information is not set, as the second unit. The control sub-block of the first unit causes the control sub-block of the unset unit to store unit connection order information "UT2" indicating the second unit, and proceeds to step ST4. It is noted that, in a configuration illustrated in FIG. 15, the expansion unit 14-1 is defined as the second unit.

In step ST4, the control sub-block of the second unit sets the unit connection order information to the third unit. The control sub-block of the second unit defines an unset unit to which the unit connection order information is not set, as the third unit. Further, the control sub-block of the second unit causes the control sub-block of the unset unit to store unit connection order information "UT3" indicating the third unit, and proceeds to the next step. It is noted that, in the configuration illustrated in FIG. 15, the expansion unit 14-2 is defined as the third unit.

Hereinafter, the similar processing is performed in each unit, and in step ST5, the control sub-block of the (n-1)th unit sets the unit connection order information to the n-th unit. The control sub-block of the (n-1)th unit defines an unset unit to which the unit connection order information is not set, as the n-th unit. Further, the control sub-block of the (n-1)th unit causes the control sub-block of the unset unit to store unit connection order information "UTn" indicating the n-th unit, and proceeds to the next step ST6. It is noted that, in the configuration illustrated in FIG. 15, the expansion unit 14-(n-2) is defined as the (n-1)th unit, and the expansion unit 14-(n-1) as the n-th unit.

In step ST6, the control sub-block of the n-th unit reports the unit information to the (n-1)th unit. The control sub-block of the n-th unit associates the unit connection order information "UTn" with the unit information of the n-th unit, reports the information to the control sub-block of the (n-1)th unit, and proceeds to step ST7.

In step ST7, the control sub-block of the (n-1)th unit reports the unit information to the (n-2)th unit. The control sub-block of the (n-1)th unit associates unit connection order information "UTn-1" with the unit information of the (n-1)th unit. The control sub-block of the (n-1)th unit reports the unit information to the control sub-block of the (n-2)th unit together with the unit information supplied from another unit, and proceeds to the next step. It is noted that the unit information supplied from the another unit is the unit connection order information "UTn" and the unit information of the n-th unit.

Hereinafter, the similar processing is performed in each unit, and in step ST8, the control sub-block of the second unit sets the unit information to the first unit. The control sub-block of the second unit associates the unit connection order information "UT2" with the unit information of the second unit. The control sub-block of the second unit reports the unit information to the control sub-block of the first unit together with the unit information supplied from the other units, and proceeds to step ST9. It is noted that the unit information supplied from the other units is the unit connection order information "UTn" to "UT3", and the unit information of the n-th to third units.

In step ST9, the control sub-block of the first unit reports the unit information to the control block. The control sub-block of the first unit associates the unit connection order information "UT1" with the unit information of the first unit. The control sub-block of the first unit reports the unit information to the control block 17, together with the unit information (the unit connection order information "UTn" to "UT2" and the unit information of the n-th to second units) supplied from the other units, and the process ends.

When processing is performed as described above, the control sub-block of a preceding unit sets the unit connection order information to the control sub-block of the succeeding unit. Further, the unit connection order information and the unit information of the unit is added to the information supplied from the control sub-block of the succeeding unit, and the information is sequentially transmitted to the control sub-block of a preceding unit. Accordingly, the control block 17 can determine how the slots 15 or the drive block 16 are arranged in the recording medium changer 10, based on the unit connection order information and the unit information supplied from each unit. Further, the conveying block 20 is driven based on a result of the determination, so that even if the configuration of the recording medium changer 10 is changed, a desired recording medium 90 can be transmitted appropriately, for example, between the slot 15 and the drive block 16, corresponding to a configuration having been changed.

4-2. Recording Medium Carriage Operation

Next, the control block 17 determines a configuration of the recording medium changer, based on the obtained unit connection order information and the unit information, and controls the conveying block 20 based on a result of the determination. It is noted that, in the following description, a slot 15 allowing delivery of the recording medium 90 by the recording medium delivery block 50 without moving the rail portion 31 in the depth direction (Y direction in FIG. 1) is defined as a base area slot. Further, a slot 15 in an expansion area positioned ahead of the end of the rail portion 31 and allowing delivery of the recording medium 90 by moving the rail portion 31 in the depth direction is defined as a rear side expansion area slot.

Figure 16:
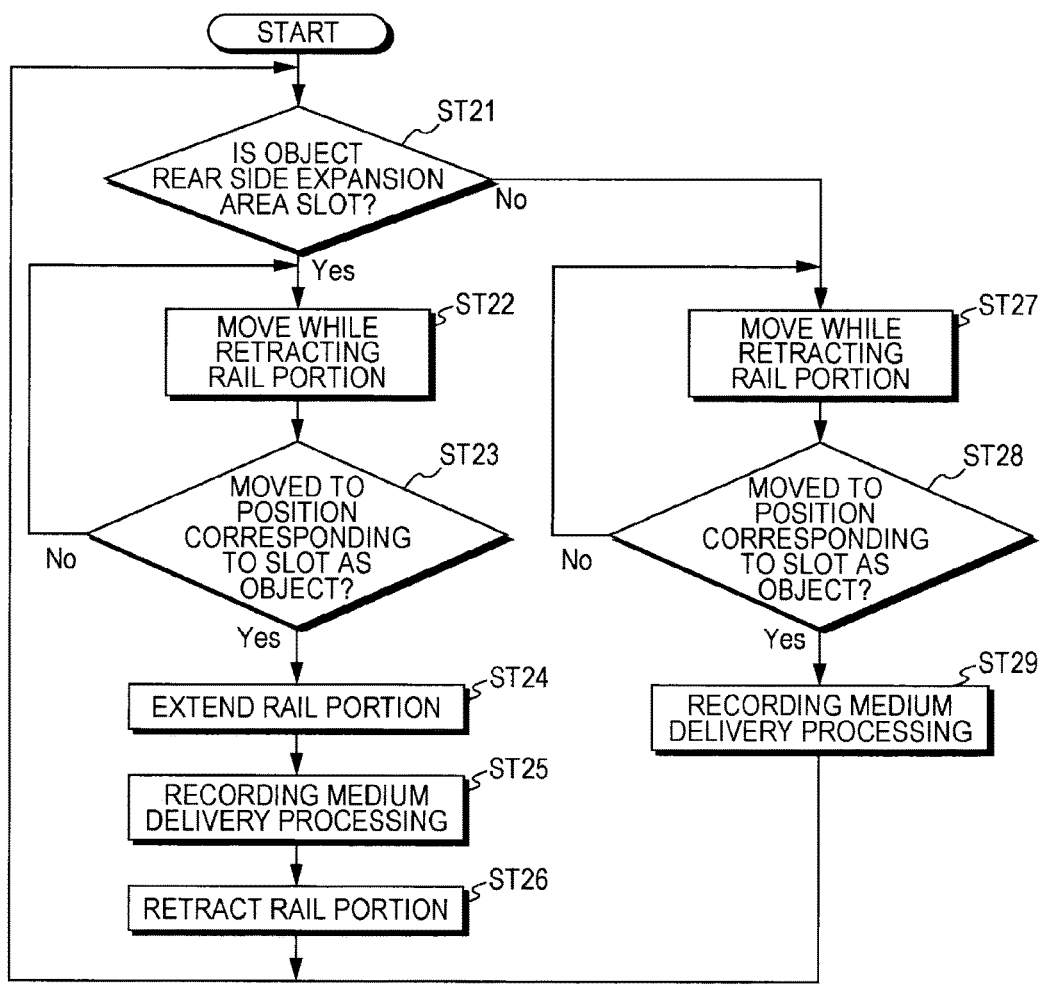
FIG. 16 is a flowchart illustrating exemplary control operation of the conveying block.

FIG. 16 is a flowchart illustrating exemplary control operation of the conveying block. In step ST21, the control block determines whether an object is the rear side expansion area slot. The control block 17 determines whether a slot 15 as the object to and from which the recording medium 90 is delivered is the rear side expansion area slot or the base area slot. When the object is the rear side expansion area slot, the control block 17 proceeds to step ST22, and when the object is the base area slot, the control block 17 proceeds to step ST27.

In step ST22, the control block moves the conveying block 20 while retracting the rail portion. When the control block 17 moves the conveying block 20 in the vertical direction (Z direction in FIG. 1) while extending the rail portion 31, the rail portion 31 may abut against the drive block 16. Therefore, when the slot 15 as the object to and from which the recording medium 90 is delivered is the rear side expansion area slot, the control block 17 starts to move the conveying block 20 in the vertical direction, after retracting the rail portion 31, and proceeds to step ST23.

In step ST23, the control block determines whether the conveying block 20 moves to a position corresponding to the slot as the object. When the recording medium delivery block 50 of the conveying block 20 moves to a height at which the recording medium delivery block 50 faces the slot 15 as the object, the control block 17 proceeds to step ST24. Further, when the recording medium delivery block 50 of the conveying block 20 does not move to the height at which the recording medium delivery block 50 faces the slot 15 as the object, the control block 17 returns to step ST22.

In step ST24, the control block extends the rail portion. The control block 17 extends the rail portion 31 to move the recording medium delivery block 50 of the conveying block 20 to a position of the slot 15 as the object in a rear side expansion area, and proceeds to step ST25.

In step ST25, the control block performs recording medium delivery processing. The control block 17 moves the recording medium delivery block 50 of the conveying block 20 to the position of the slot 15 as the object in the rear side expansion area. When the recording medium 90 is conveyed to the drive block 16 from the slot 15 as the object, the control block 17 causes the recording medium delivery block to remove the recording medium 90 stored in the slot 15, and hold the recording medium 90 in the recording medium delivery block. Further, when the recording medium 90 is conveyed from the drive block 16 to the slot 15 as the object, the control block 17 stores the recording medium 90 held in the recording medium delivery block, in the slot 15 as the object, and proceeds to step ST26.

In step ST26, the control block retracts the rail portion. When the transfer of the recording medium 90 to and from the slot 15 as the object is finished, the control block 17 retracts the rail portion 31, and returns to step ST21.

When the process proceeds from step ST21 to step ST27, the control block moves while retracting the rail portion. Since the object is the base area slot, the control block 17 can move the recording medium delivery block 50 of the conveying block 20 to the position of the slot 15 as the object without extending the rail portion 31. Accordingly, the control block 17 starts to move the conveying block 20 in the vertical direction while retracting the rail portion, and proceeds to step ST28.

In step ST28, the control block determines whether the conveying block 20 moves to a position corresponding to the slot as the object. When the recording medium delivery block 50 of the conveying block 20 moves to the height at which the recording medium delivery block 50 faces the slot 15 as the object, the control block 17 proceeds to step ST29. Further, when the recording medium delivery block 50 of the conveying block 20 does not moves to the height at which the recording medium delivery block 50 faces the slot 15 as the object, the control block 17 returns to step ST27.

In step ST29, the control block performs recording medium delivery processing. The control block 17 moves the recording medium delivery block 50 of the conveying block 20 to the position of the slot 15 as the object in the base area. When the recording medium 90 is conveyed to the drive block 16 from the slot 15 as the object, the control block 17 causes the recording medium delivery block to remove the recording medium 90 stored in the slot 15, and hold the recording medium 90 in the recording medium delivery block. Further, when the recording medium 90 is conveyed from the drive block 16 to the slot 15 as the object, the control block 17 stores the recording medium 90 held in the recording medium delivery block, in the slot 15 as the object, and proceeds to step ST21.

Further, when the recording medium 90 is delivered to and from the drive block 16, the drive block 16 is provided in the expansion area positioned ahead of the end of the rail portion 31. Accordingly, the control block 17 moves the conveying block 20 in the vertical direction while retracting the rail portion 31. As described above, when the rail portion 31 is moved in the vertical direction while being retracted, the rail portion 31 can be prevented from making contact with the drive block 16 or the like.

As described above, when the rail portion 31 is configured to be extended and retracted, even if the slot expansion unit is provided or the drive block 16 is changed to the slots 15 and the rear side expansion area slot is provided, the rail portion 31 can be extended to deliver the recording medium to and from the rear side expansion area slot. Accordingly, for example, a large number of recording mediums 90 are efficiently stored for changer operation.

5. Other Configurations and Operation

Incidentally, when the rail portion 31 has insufficient rigidity or the like, moving the recording medium delivery block 50 toward the end side of the rail portion 31 (rearmost side), while extending the rail portion 31, causes bending of the end of the rail portion 31 downward by the weight of the recording medium delivery block 50 or the like. Further, when the rail portion 31 is bent downward, even if the conveying block 20 is moved to the desired position, the recording medium delivery block 50 moved to the end of the rail portion 31 is located at a position shifted downward from the position of the recording medium 90. Therefore, the recording medium delivery block 50 may not deliver the recording medium 90 appropriately.

Therefore, in order to deliver the recording medium to and from the rear side expansion area slot, for example as illustrated in FIG. 6, the rail support portions 115 and 125 are provided at a position corresponding to the end of the rail portion 31 (back side of the housing), when the rail portion 31 is extended. The rail support portions may be previously provided for slots having different heights to handle provision of the rear side expansion area slots. When the rail support portion is configured as described above, even if the rigidity of the rail portion 31 or the like is not fully increased, the end of the rail portion 31 is prevented from being bent downward by the weight of the recording medium delivery block 50 or the like. Accordingly, the recording medium 90 can be appropriately delivered.

Further, the recording medium delivery block 50 is positioned at a rear end side position of the rail portion 31 (front side of the housing), and after the movement of the rail is finished, the recording medium delivery block 50 is moved. When configured as described above, the rail portion 31 is not extended or retracted, while the recording medium delivery block 50 is positioned on the end side of the rail portion 31, so that the rail portion 31 can be stably extended or retracted.

Further, as illustrated in FIGS. 8 to 11(C), when the recording medium delivery block 50 moves on the rail portion, a space for the conveying block 20 or the rail portion 31 is required under the desired slot 15. Accordingly, when a drive block 16 is added in this space, the added drive block 16 obstructs extension of the rail portion 31, and the recording medium 90 cannot be delivered to and from the slot 15 positioned in an area adjacently above the drive block 16. Accordingly, the drive block 16 is added sequentially in a direction from a position of the recording medium delivery block 50 to a position of the rail portion, that is, when the rail portion 31 is below the recording medium delivery block 50, the drive blocks 16 are add sequentially in a direction from the upper side to the lower side in the housing. When the drive blocks 16 are added as described above, a large number of recording mediums 90 are efficiently stored for a changer operation. Additionally, when the drive blocks 16 have different sizes in depth direction (Y direction in FIG. 1), the drive block 16 having a smaller size is positioned on the lower side, and the slots 15 are provided by a reduction in size of the drive block 16 in the depth direction. Accordingly, a larger number of recording mediums 90 are efficiently stored for changer operation.

Further, addition of the slots 15 or the type of drive block 16 increased is detected by a sensor, a switch, or the like, and the unit information is generated by the control sub-block based on a result of the detection. When configured as described above, the control block 17 can determine a condition of the added slot 15 or drive block 16, based on the unit information. Accordingly, even if the configuration of the recording medium changer 10 is changed, the control block 17 can control the operation of the conveying block 20 according to a changed state based on the unit information.

Figure 17:
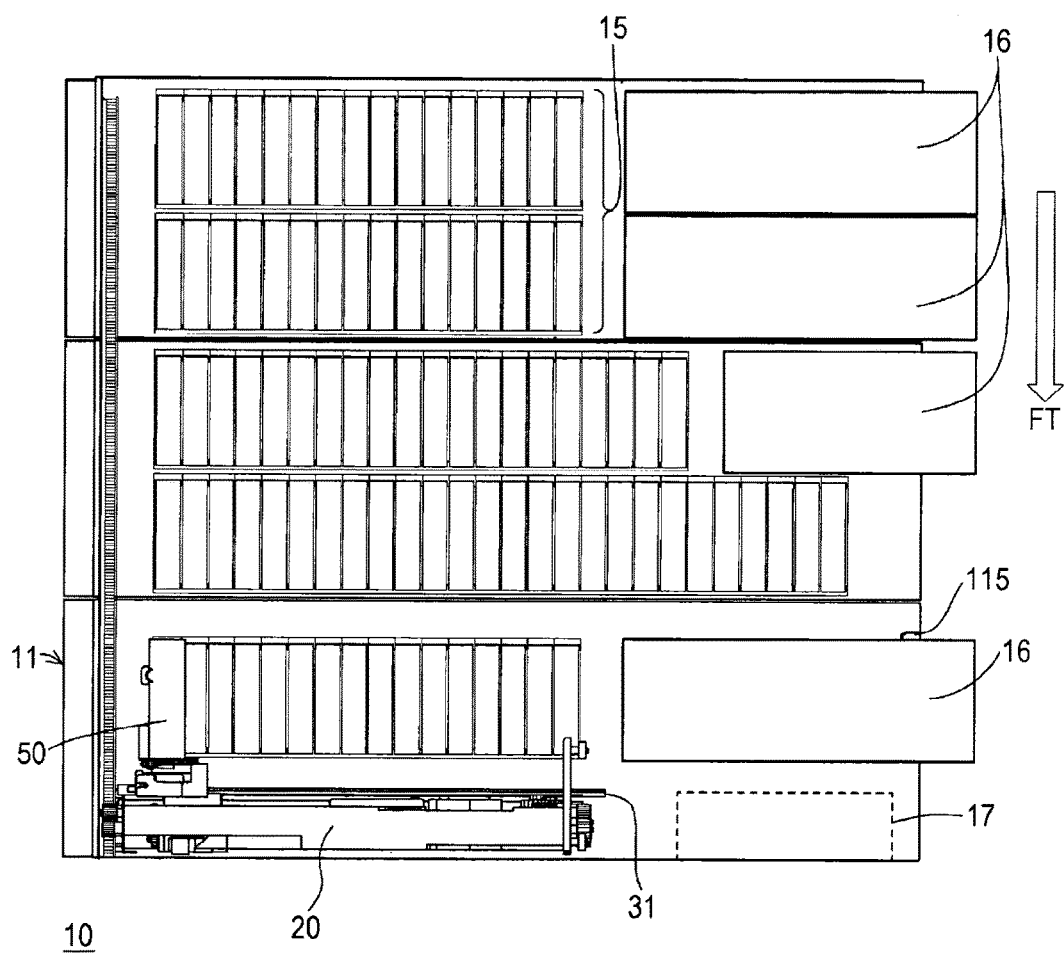
FIG. 17 is a diagram illustrating an exemplary arrangement of drive blocks.

Further, the control block 17 can determine whether the drive block 16 is added, based on the unit information from each control sub-block. Accordingly, arrangement of the drive block 16 may be notified to the user so that a larger number of slots 15 for delivering the recording mediums 90 are provided. That is, the expansion area is provided in an extending direction of the rail portion 31, in a moving direction of the conveying block 20 (Z direction in FIG. 1), and the slot 15 or the drive block 16 can be added. As illustrated in FIG. 17, the user is notified to add the drive blocks 16 sequentially in a direction indicated by an arrow FT, from a side opposite to an arrangement side on which the rail portion 31 is arranged with respect to the recording medium delivery block 50, to the arrangement side, in the expansion area. The notification to the user is performed using, for example, the display portion 102 as a user notification unit. Alternatively, the notification to the user may be performed using sound or the like.

Owing to performance of such notification, in the recording medium changer 10, the drive block 16 can be added so that the recording medium delivery block 50 is moved by extending the rail portion 31 to a position of the slot 15 provided in the expansion area in the extension direction of the rail portion 31. Accordingly, a larger number of slots 15 and drive blocks 16 can be efficiently arranged. Further, when the drive blocks 16 have different sizes in the extension direction of the rail portion 31, the drive blocks are arranged sequentially in a direction indicated by an arrow FT, from the drive block having a larger size in the extending direction, as illustrated in FIG. 17. When configured as described above, the slots 15 and the drive blocks 16 can be efficiently arranged. Further, when the drive blocks 16 are arranged as descried above, the expansion units in FIG. 15 has a configuration in which the slot expansion unit is provided between the base unit and the drive expansion unit.

It is noted that the above-mentioned control block 17 has a configuration for obtaining the unit information from the control sub-blocks, but a signal of the switch or the like may be supplied to the control block 17 to determine the configuration of the recording medium changer 10.

Further, the present technology should not be interpreted as being limited to the above-mentioned embodiment of the present technology. The embodiment of the present technology discloses the present technology in the form of example, and it is apparent that modifications and substitutions of the embodiment can be made by those skilled in the art without departing from the scope of the present technology. That is, reference is to be made to the following claims to determine the scope of the present technology.

Further, the present technology may have the following configurations.

(1) A recording medium changer including:
a plurality of slots for storing recording mediums;
a drive for performing operation using a recording medium;
a recording medium delivery mechanism having a conveying mechanism for conveying the recording mediums between the plurality of slots and the drive, and a conveying mechanism control portion for controlling the operation of the conveying mechanism,
the conveying mechanism for delivering the recording mediums to and from the slots or the drive; and
an extendable and retractable rail portion for moving the recording medium delivery mechanism to a desired slot,
the conveying mechanism control portion determining whether the slot is provided in an expansion area provided in an extending direction of the rail portion to perform extension and retraction operation of the rail portion based on a result of the determination.

(2) The recording medium changer according to (1) in which, when the slots are provided in the expansion area, and the recording medium delivery mechanism delivers a recording medium to and from a slot in the expansion area, the conveying mechanism control portion extends the rail portion.

(3) The recording medium changer according to (1) or (2), in which, when the conveying mechanism is moved, the conveying mechanism control portion retracts the rail portion.

(4) The recording medium changer according to any one of (1) to (3), in which the conveying mechanism control portion extends and retracts the rail portion, positioning the recording medium delivery mechanism at a rear end side position of the extendable and retractable rail portion.

(5) The recording medium changer according to any one of (1) to (4), in which a rail support portion for supporting an end side of the extended rail portion is further provided.

(6) The recording medium changer according to any one of (1) to (5), in which the expansion area is configured to be provided as a unit,
and the conveying mechanism control portion obtains, from each unit, information representing an arrangement state of the slots and the drive in the expansion area, and determines whether the slots are provided in an expansion area provided in an extending direction of the rail portion.

(7) The recording medium changer according to (6), in which the unit outputs information representing a unit connection order to the conveying mechanism control portion, together with the information representing an arrangement state.

(8) The recording medium changer according to any one of (1) to (7) further including a user notification unit for notifying a user to arrange the drives in the expansion area sequentially in a direction from the position of the recording medium delivery mechanism to the position of the rail portion.

INDUSTRIAL APPLICABILITY

In the recording medium changer according to the present technology, the conveying mechanism for conveying the recording mediums between the slots and the drive is provided with the recording medium delivery mechanism for delivering the recording mediums to and from the slots or the drive, and the extendable and retractable rail portion for moving the recording medium delivery mechanism to a desired slot, the conveying mechanism control portion determines whether the slot is provided in the expansion area provided in the extending direction of the rail portion to perform the extension and retraction operation of the rail portion based on a result of the determination. Therefore, when the slots are added in the expansion area, the recording mediums stored in the added slots can be used, so that the recording mediums are efficiently stored for changer operation. Accordingly, the recording medium changer according to the present technology is suitable for a recording medium changer storing, in slots, recording mediums such as tapes or disks, semiconductor memories, or cartridges storing them, and the cartridges storing the recording mediums, and selectively using a recording medium stored in a slot.

REFERENCE SIGNS LIST

10 Recording medium changer
11 Base unit
12 Slot expansion unit
13 Drive expansion unit
14-1 to 14-(n-1) Expansion unit
15 Slot
16 Drive block
17 Control block
18 Power supply block
20 Conveying block
21 Conveying block chassis
31 Rail portion
32 Drive transmitting portion
40 Recording medium delivery block base
45 Recording medium delivery block holding portion
50 Recording medium delivery block
81 Cable
90 Recording medium
115, 125 Rail support portion
211 Slide guide
221 Conveying block moving motor
222F, 222R Drive transmitting portion
311, 312 Rack
313 Guide
321 Rail moving motor
322 Drive transmitting portion

The invention claimed is:

1. A recording medium changer comprising:
   a plurality of slots for storing recording mediums;
   a drive for performing operation using a recording medium;
   a recording medium delivery mechanism having a conveying mechanism for conveying the recording mediums between the plurality of slots and the drive, and a conveying mechanism control portion for controlling the operation of the conveying mechanism;
   the conveying mechanism for delivering the recording mediums to and from the slots or the drive; and
   an extendable and retractable rail portion for moving the recording medium delivery mechanism to a desired slot,
   the conveying mechanism control portion determining whether the slot is provided in an expansion area provided in an extending direction of the rail portion to perform extension and retraction operation of the rail portion based on a result of the determination.

2. The recording medium changer according to claim 1 wherein, when the slots are provided in the expansion area, and the recording medium delivery mechanism delivers a recording medium to and from a slot in the expansion area, the conveying mechanism control portion extends the rail portion.

3. The recording medium changer according to claim 1, wherein, when the conveying mechanism is moved, the conveying mechanism control portion retracts the rail portion.

4. The recording medium changer according to claim 1, wherein the conveying mechanism control portion extends and retracts the rail portion, positioning the recording medium delivery mechanism at a rear end side position of the extendable and retractable rail portion.

5. The recording medium changer according to claim 1, wherein a rail support portion for supporting an end side of the extended rail portion is further provided.

6. The recording medium changer according to claim 1, wherein
   the expansion area is configured to be provided as a unit, and
   the conveying mechanism control portion obtains, from each unit, information representing an arrangement state of the slots and the drive in the expansion area, and determines whether the slots are provided in an expansion area provided in an extending direction of the rail portion.

7. The recording medium changer according to claim 6, wherein the unit outputs information representing a unit connection order to the conveying mechanism control portion, together with the information representing an arrangement state.

8. The recording medium changer according to claim 1, wherein
   the expansion area is provided in an extending direction of the rail portion, in a moving direction of the conveying mechanism, so that the slots or the drive are added, and
   the expansion area further includes a user notification unit for notifying a user to arrange the drives sequentially in a direction from a side opposite to an arrangement side on which the rail portion is arranged with respect to the recording medium delivery mechanism, to the arrangement side.

9. A control method for a recording medium changer including a plurality of slots for storing recording mediums, a drive for performing operation using a recording medium, a recording medium delivery mechanism having a conveying mechanism for conveying the recording mediums between the plurality of slots and the drive, and a conveying mechanism control portion for controlling the operation of the conveying mechanism, the conveying mechanism for delivering the recording mediums to and from the slots or the drive, and an extendable and retractable rail portion for moving the recording medium delivery mechanism to a desired slot,
   the method comprising the steps of:
   determining, by the conveying mechanism control portion, whether the slot is provided in an expansion area provided in an extending direction of the rail portion; and
   performing, by the conveying mechanism control portion, extension and retraction operation of the rail portion based on a result of the determination.

* * * * *